(12) United States Patent
Eiyama et al.

(10) Patent No.: US 10,110,757 B2
(45) Date of Patent: Oct. 23, 2018

(54) PRINTING APPARATUS AND NOTIFICATION METHOD OF PRINTING APPARATUS ABNORMALITY IN A PRINTING APPARATUS

(71) Applicant: CANON KABUSHIKI KAISHA, Tokyo (JP)

(72) Inventors: Masato Eiyama, Yokohama (JP); Takayuki Tanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/413,915

(22) Filed: Jan. 24, 2017

(65) Prior Publication Data

US 2017/0237866 A1    Aug. 17, 2017

(30) Foreign Application Priority Data

Feb. 16, 2016  (JP) ................................. 2016-027247
Dec. 6, 2016   (JP) ................................. 2016-237092

(51) Int. Cl.
| G06K 15/10 | (2006.01) |
| H04N 1/00  | (2006.01) |
| B41J 2/01  | (2006.01) |
| G06K 9/00  | (2006.01) |
| G06K 15/00 | (2006.01) |
| B41J 19/20 | (2006.01) |

(52) U.S. Cl.
CPC ............ *H04N 1/00058* (2013.01); *B41J 2/01* (2013.01); *B41J 19/205* (2013.01); *B41J 19/207* (2013.01); *G06K 9/0053* (2013.01); *G06K 15/102* (2013.01); *G06K 15/4085* (2013.01); *H04N 1/00034* (2013.01); *H04N 1/00037* (2013.01); *H04N 1/00074* (2013.01); *H04N 2201/0082* (2013.01)

(58) Field of Classification Search
USPC ................................ 358/1.1–3.29, 1.11–1.18
See application file for complete search history.

(56) References Cited

U.S. PATENT DOCUMENTS

| 8,141,978  | B2  | 3/2012  | Miyazawa |  |
| 2011/0307093 | A1* | 12/2011 | Tsai | G05B 19/4062 |
|  |  |  |  | 700/177 |
| 2013/0125373 | A1* | 5/2013 | Bancroft | F16L 17/04 |
|  |  |  |  | 29/525.01 |
| 2013/0135369 | A1* | 5/2013 | Price | B41J 19/202 |
|  |  |  |  | 347/9 |

FOREIGN PATENT DOCUMENTS

WO    2010/084606  A1    7/2010

* cited by examiner

*Primary Examiner* — Marcellus Augustin
(74) *Attorney, Agent, or Firm* — Fitzpatrick, Cella, Harper & Scinto

(57) ABSTRACT

According to an embodiment of this invention, the following processing is performed to solve a problem of accurately determining an abnormal state in a carriage by using an acceleration sensor. Output values from a plurality of acceleration sensors mounted in locations which have low degrees of mechanical/physical coupling in a carriage and a printing apparatus main body are transformed into data in a frequency domain. Subsequently, a carriage operation abnormality and a level of the abnormal state are determined based on a plurality of acceleration values in the frequency domain and a comparison of magnitudes of the acceleration values.

9 Claims, 20 Drawing Sheets

F I G. 15
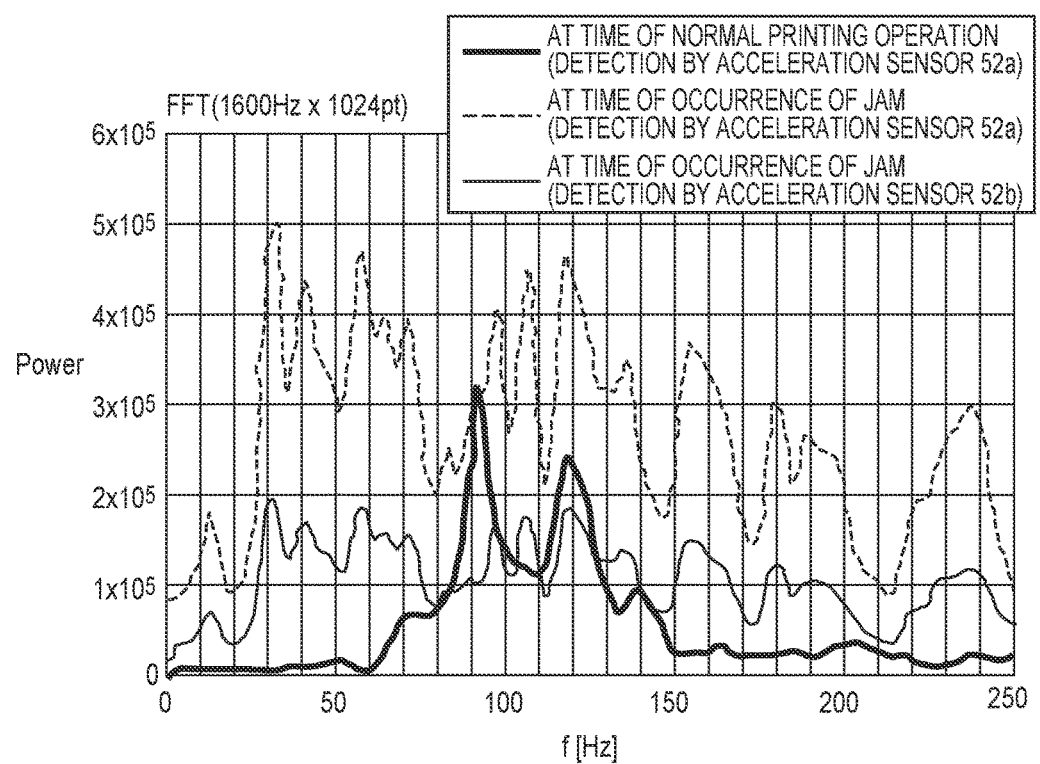

PRINTING APPARATUS AND NOTIFICATION METHOD OF PRINTING APPARATUS ABNORMALITY IN A PRINTING APPARATUS

BACKGROUND OF THE INVENTION

Field of the Invention

The present invention relates to a printing apparatus that performs printing by reciprocally moving a carriage and a notification method of a carriage operation abnormality in a printing apparatus.

Description of the Related Art

According to International Publication WO 2010/084606, a printing apparatus includes an acceleration sensor that detects the acceleration applied to a carriage, and a carriage operation abnormality, more specifically, whether a printhead has come into contact with a printing sheet, is determined from the detected acceleration. The detected acceleration is compared to a threshold during carriage movement, and the carriage is stopped if an abnormal state is determined from the comparison result.

Among printing apparatuses, there is an apparatus that has an arrangement in which ink tanks are exchangeable during printing or a plurality of paper rolls are settable. In such a printing apparatus, an external impulse (vibration) may be applied to the printing apparatus due to a user operation during a printing operation. For example, if an ink tank cover is carelessly closed or a heavy-weight paper roll is set, a vibration that occurs from this operation is detected by the acceleration sensor. Hence, it may be erroneously determined that the carriage operation is abnormal.

SUMMARY OF THE INVENTION

Accordingly, the present invention is conceived as a response to the above-described disadvantages of the conventional art.

For example, a printing apparatus and a notification method of printing apparatus abnormality in a printing apparatus according to this invention are capable of more accurately determining a carriage operation abnormality.

According to one aspect of the present invention, there is provided a printing apparatus comprising: a carriage configured to mount a printhead and move; a first acceleration sensor provided in the carriage; a transformation unit configured to obtain a first spectrum by frequency-transforming an output of the first acceleration sensor; and a determination unit configured to determine, based on the first spectrum, at least one of an operation abnormality of the carriage and an external impulse given to the printing apparatus.

According to another aspect of the present invention, there is provided a notification method of an abnormality in a printing apparatus, comprising: measuring, by a first sensor provided in a carriage, a vibration of the carriage that is movable in a printing apparatus; obtaining a first spectrum by frequency-transforming a signal of the first sensor; and notifying, based on the first spectrum, a user of at least one of an operation abnormality of the carriage and an external impulse given to the printing apparatus.

According to still another aspect of the present invention, there is provided a printing apparatus comprising: a carriage, included in a printing apparatus main body, configured to mount a printhead and move; a first acceleration sensor provided in the carriage; a second acceleration sensor provided outside of the carriage in the printing apparatus; and a determination unit configured to determine, based on detections from the first acceleration sensor and the second acceleration sensor, at least one of an operation abnormality of the carriage and an external impulse given to the printing apparatus.

According to still another aspect of the present invention, there is provided a notification method of an abnormality in a printing apparatus, comprising: measuring, by a first sensor provided in a carriage, a vibration of the carriage that is movable in a printing apparatus; measuring a vibration of the printing apparatus by a second sensor provided outside of the carriage in the printing apparatus; and notifying, based on detections by the first sensor and the second sensor, a user of at least one of an operation abnormality of the carriage and an external impulse given to the printing apparatus.

The invention is particularly advantageous since a carriage operation abnormality can be more accurately detected.

Further features of the present invention will become apparent from the following description of exemplary embodiments (with reference to the attached drawings).

BRIEF DESCRIPTION OF THE DRAWINGS

FIG. 15 is a line graph showing the acceleration frequency spectra when a severe jam occurs during a carriage operation in the printing apparatus shown in FIG. 11.

DESCRIPTION OF THE EMBODIMENTS

Exemplary embodiments of the present invention will now be described in accordance with the accompanying drawings. Note that the relative arrangement of components and the like set forth in the embodiments do not limit the scope of the present invention unless otherwise specified.

In this specification, the terms "print" and "printing" not only include the formation of significant information such as characters and graphics, but also broadly include the formation of images, figures, patterns, and the like on a print medium, or the processing of the medium, regardless of whether they are significant or insignificant and whether they are so visualized as to be visually perceivable by humans.

Also, the term "print medium (or sheet)" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

<Overview of Printing Apparatus (FIGS. 1 to 4)>

Figure 1:
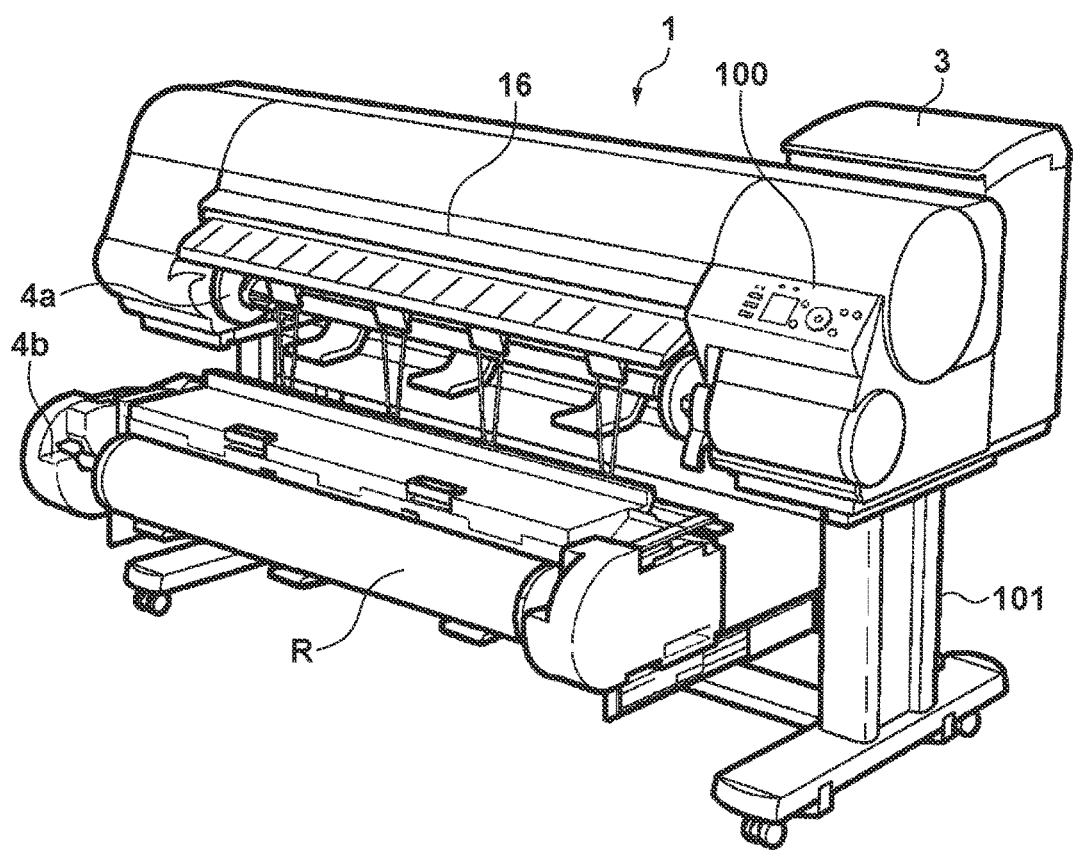
FIG. 1 is a perspective view showing the schematic arrangement of an inkjet printing apparatus as a representative embodiment of the present invention.

FIG. 1 is a schematic perspective view showing an inkjet printing apparatus (to be referred to as a printing apparatus hereinafter) as a representative embodiment of the present invention.

As shown in FIG. 1, a printing apparatus 1 is arranged with an operation panel 100 for performing various kinds of settings related to printing and displaying the state of the apparatus. The printing apparatus 1 is supported by a stand 101, and its printing unit is typically covered by a cover 16 that can be opened and closed. The printing apparatus 1 also includes an ink tank cover 3 which is operated when ink tanks are exchanged. A carriage (to be described later) is mounted on the printing apparatus 1 and is provided with an inkjet printhead (to be referred to as a printhead hereinafter) that performs printing by discharging ink droplets. Note that a sheet such as a rolled sheet having a width of 10 inches to 60 inches is loaded in the printing apparatus 1 in the moving direction (main scanning direction) of the carriage, and this sheet is fed to a printing region of the printhead to perform printing.

Additionally, as shown in FIG. 1, the rolled sheet can be stored in two stages (an upper paper roll attachment portion 4a and a lower paper roll attachment portion 4b), and printing can be performed on the rolled sheet R loaded in either stage.

Figure 2:
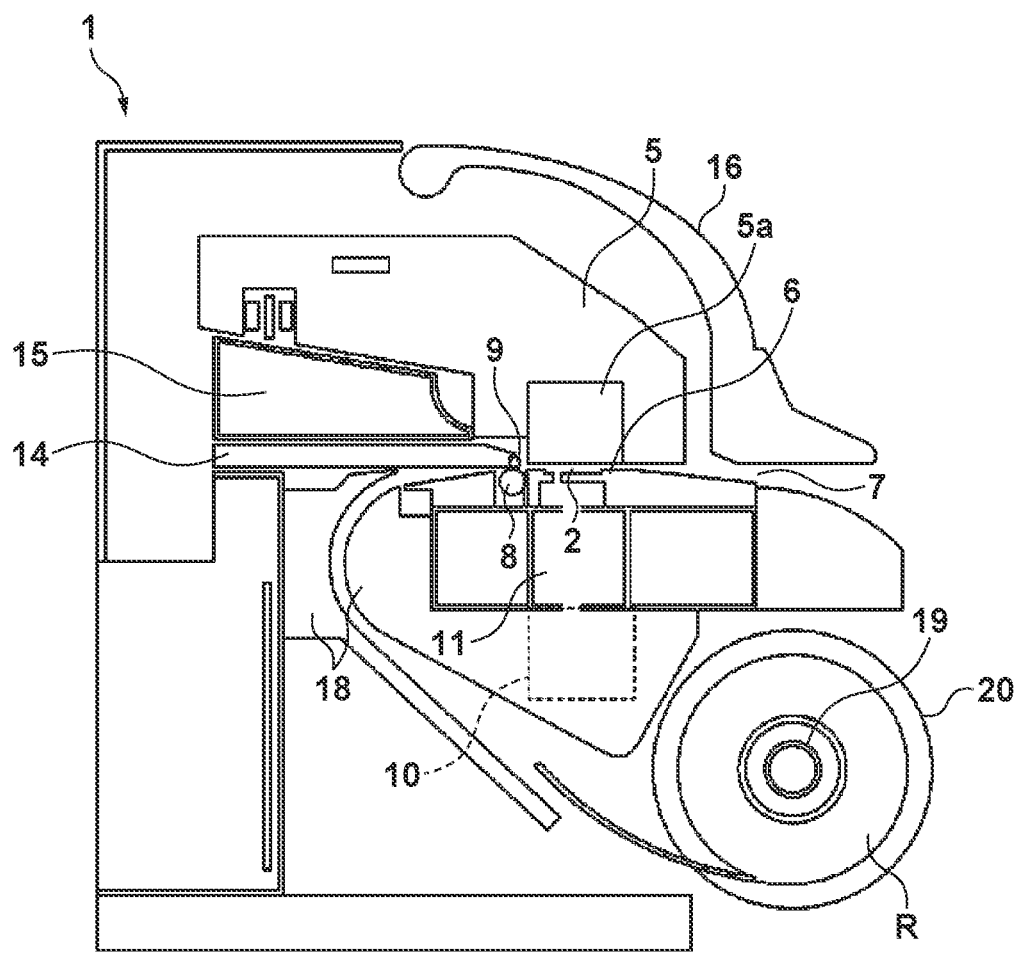
FIG. 2 is a side sectional view showing the internal structure of the printing apparatus shown in FIG. 1.

FIG. 2 is a side sectional view of the schematic arrangement of the printing apparatus 1 shown in FIG. 1.

As shown in FIG. 2, the printing apparatus 1 uses the rolled sheet 1 as a sheet. Note that for the sake of descriptive convenience in FIG. 2, only one stage of the paper roll attachment portions provided as a two-stage arrangement is illustrated. A paper feed unit 20 of the printing apparatus 1 includes a spool shaft 19 having two ends rotatably supported, and the rolled sheet R is attached to the spool shaft 19. One end of the rolled sheet R pulled out from the paper feed unit 20 is passed through a U-turn-shaped pair of conveyance guides 18, is nipped by a conveyance roller 8 and a pinch roller 9, and is sequentially output to a printing region 2 in accordance with the driving of the conveyance roller 8 by a conveyance motor (to be described later).

At this time, a rotational brake force is constantly applied to the spool shaft 19 of the paper feed unit 20 due to the action of a torque limiter (not shown) and a predetermined tension is constantly applied to the pulled-out sheet R, thereby preventing the sheet R from slacking in the conveyance path. Subsequently, an image formation process (to be described later) is executed on the sheet R in the printing region 2.

Figure 3:
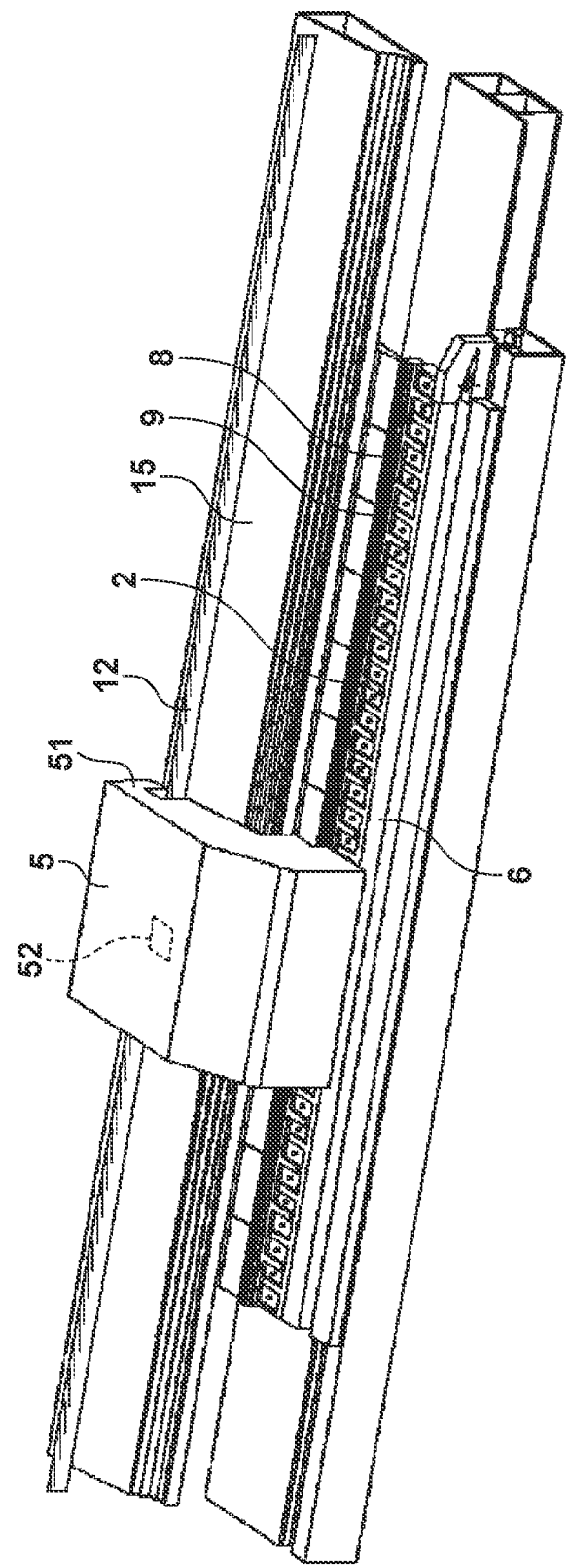
FIG. 3 is an enlarged view showing the detailed arrangement of a portion where a carriage moves in the printing apparatus shown in FIG. 1.

FIG. 3 is a schematic perspective view showing the internal arrangement in the moving direction of the carriage of the printing apparatus 1.

As is apparent from FIG. 3, a scale film 12 provided with slits at equal intervals is arranged in a direction perpendicular to the conveyance direction of the sheet R. The two ends of the scale film 12 are supported by a structure 15 of the printing apparatus 1 via support members. In addition, in a carriage 5 capable of reciprocal movement in the width direction of the sheet R, a linear encoder including an encoder sensor 51 which detects the slits of the scale film 12 and an acceleration sensor 52 which detects the acceleration (vibration) of the carriage 5 in the moving direction (main scanning direction) are arranged.

An image formation process will be described next with reference to FIGS. 2 and 3.

In the printing region 2, a printhead 5a including a plurality of nozzles for discharging ink is mounted on the carriage 5 and performs image formation on the sheet R whose back surface is supported by a platen 6. More specifically, the carriage 5 is moved in the forward direction and the backward direction by a carriage motor (to be described later) while the conveyance of the sheet R is stopped. At this time, one scan of printing is performed by discharging ink droplets from the printhead 5a to the sheet R. When the one scan of printing is completed, the sheet R nipped by the conveyance roller 8 and the pinch roller 9 is conveyed a predetermined amount in a direction (sub scanning direction) perpendicular to the moving direction of the carriage 5. Then, the carriage 5 moves again in the forward direction or the backward direction, and the next one scan of printing is performed. Note that the pinch roller 9 is supported by a pinch roller holder 14 and is arranged so as to press against the conveyance roller 8.

Note that a platen fan 10 is provided below the platen 6 so as to prevent the sheet R from floating in the printing region 2 by suctioning air through a plurality of holes provided on the platen 6 via a buffer chamber 11.

In this manner, intermittent conveyance is repetitively performed on the sheet R, and image formation is performed by overlaying printing per scan. At this time, the printing overlay count changes in accordance with each printing mode determined by the type of the sheet R and the printing quality (definition) set by a user. The conveyance amount by which the sheet is conveyed during intermittent conveyance changes for each printing mode.

The sheet R printed as described above is discharged outside the apparatus by a discharge port 7. The printed sheet R can be cut by a sheet cutter (not shown), and the cut sheet can be easily taken out by opening the cover 16.

Figure 4:
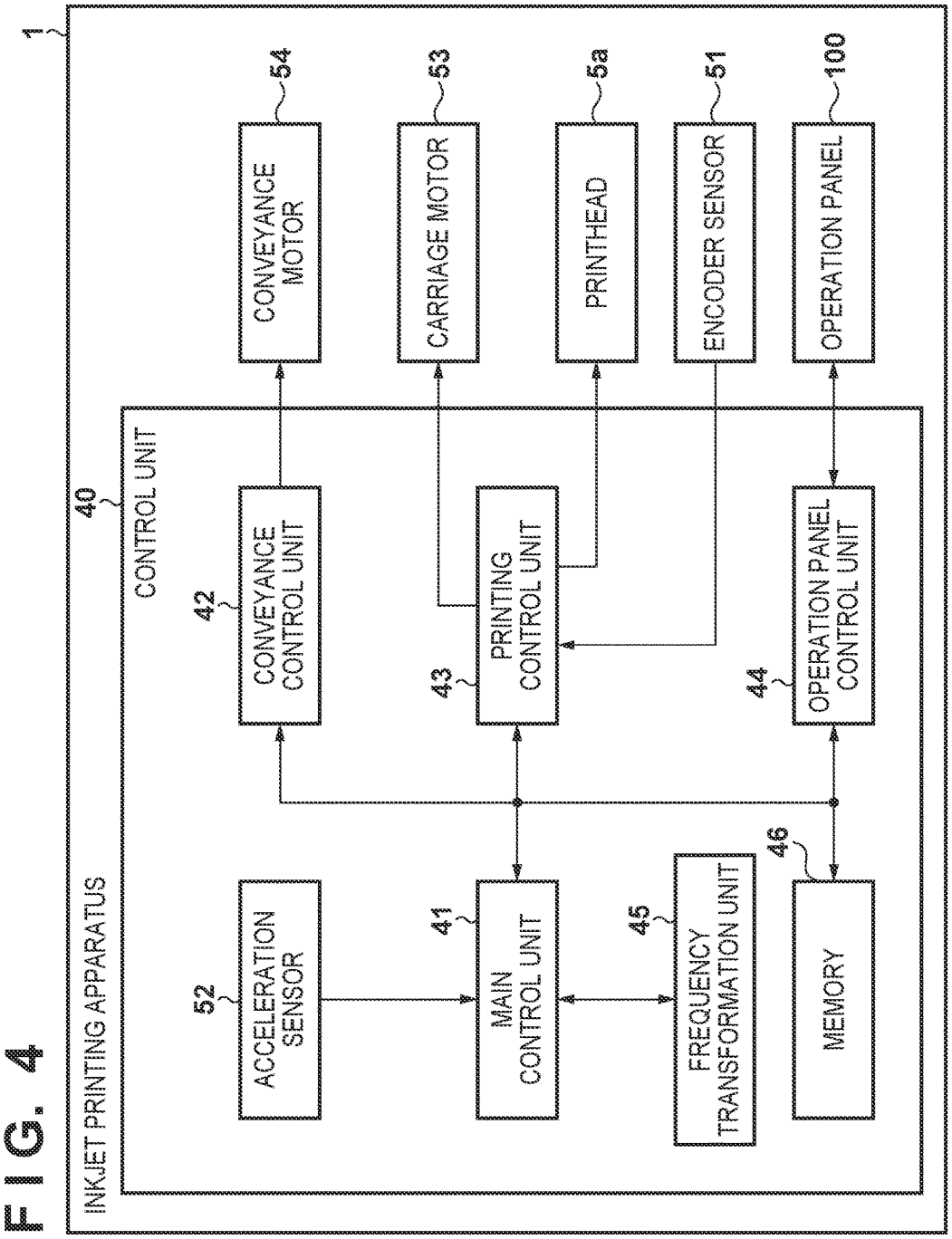
FIG. 4 is a block diagram showing the control arrangement of the printing apparatus shown in FIG. 1.

FIG. 4 is a block diagram showing the control arrangement of the printing apparatus 1 described with reference to FIGS. 1 to 3.

As shown in FIG. 4, the printing apparatus 1 includes a control unit 40, and the control unit 40 includes a main control unit 41, a conveyance control unit 42, a printing control unit 43, and an operation panel control unit 44. The main control unit 41 includes a CPU, a ROM, and a RAM and controls the entire operation of the printing apparatus 1. However, each unit of the apparatus is controlled via the conveyance control unit 42, the printing control unit 43, and the operation panel control unit 44.

That is, a conveyance motor 54 is controlled via the conveyance control unit 42, a carriage motor 53 and the printhead 5a are controlled based on an encoder signal output from the encoder sensor 51, and the operation panel 100 is controlled via the operation panel control unit 44.

Additionally, the main control unit 41 transfers an operation command to each of the conveyance control unit 42, the printing control unit 43, and the operation panel control unit 44 based on input values from the acceleration sensor 52 and the encoder sensor 51.

The carriage motor 53 is servo-controlled via the printing control unit 43. That is, position information from the encoder sensor 51 is fed back, the speed of the carriage 5 is calculated from the position information, and the drive of the carriage motor 53 is controlled so that the speed of the carriage 5 will be a target value. Therefore, if the speed of the carriage 5 is smaller than the target value, the carriage motor 53 is driven. In this case, the carriage 5 is accelerated, and this acceleration is measured by the acceleration sensor 52.

The acceleration information from the acceleration sensor 52 is temporarily held in a memory 46 via the main control unit 41. When data of points to be used for frequency transformation are stored in the memory 46, the acceleration information is transformed from the time domain to the frequency domain by a frequency transformation unit 45. In this embodiment, frequency transformation is performed using FFT. Although the use of FFT allows for a short processing time and a light processing load, the number of data to be used for the transformation is restricted (the number of points to be used for frequency transformation has a power of two). Hence, if transformation is to be repeated at short cycles, a general discrete fast Fourier transform (DFFT) may be used. However, if DFFT is used, its arithmetic circuit and the transformation load become massive as the number of data is increased. Therefore, it is preferable to collect the acceleration information at short cycles and perform frequency transformation processing by FFT.

Note that in this embodiment, the frequency transformation unit 45 is arranged independently of the main control unit 41. Hence, the frequency transformation unit 45 obtains the acceleration value in the memory 46 by DMA access with the memory 46 and writes back the spectrum of the frequency domain in the memory again after executing frequency transformation by FFT in the hardware circuit.

Note that the present invention is not limited to this, and the CPU in the main control unit may execute FFT processing by software (firmware). Frequency transformation may also be performed by providing a frequency transformation circuit in the hardware forming the main control unit 41 such as ASIC and SoC that control the printing apparatus.

Furthermore, a frequency transformation unit may be provided in the acceleration sensor, and a sensor which outputs data that has been transformed into the frequency domain may be used. In this case, it may be a sensor that continuously outputs frequency domain data each time the acceleration information is transformed into the frequency domain or it may be a sensor that continuously outputs only designated frequency values via an external I/F. Alternatively, a trigger may be received via the external I/F, and a value may be output or frequency transformation may be performed based on the timing of the trigger.

Next, the power spectra of vibrations of the carriage 5 obtained using the printing apparatus having the above-described arrangement will be described.

<Overview of Acceleration Change (FIGS. 5A and 5B)>

Figure 5A:
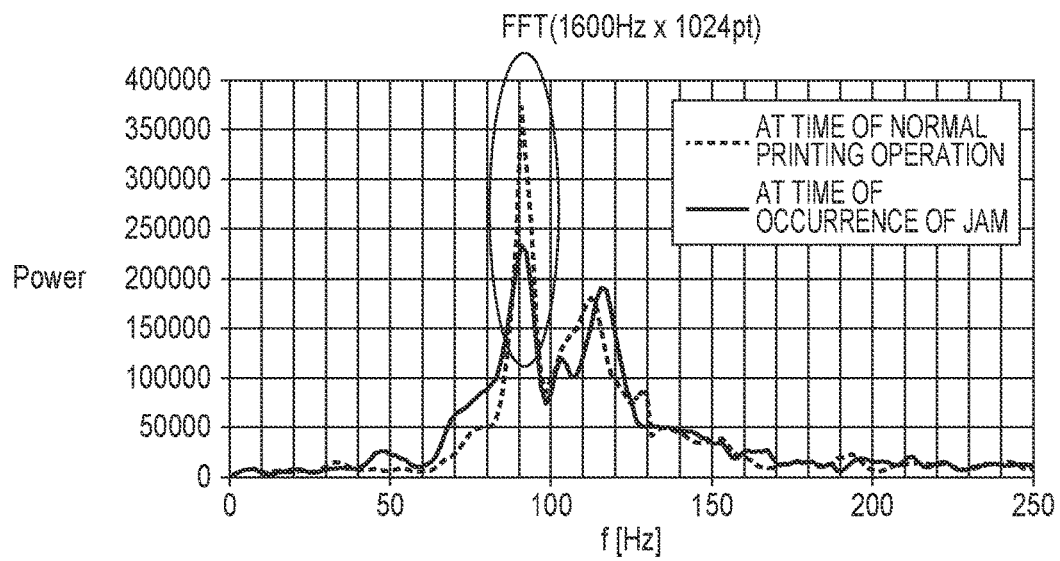
FIGS. 5A and 5B are line graphs showing acceleration frequency spectra during a carriage operation.
Figure 5B:
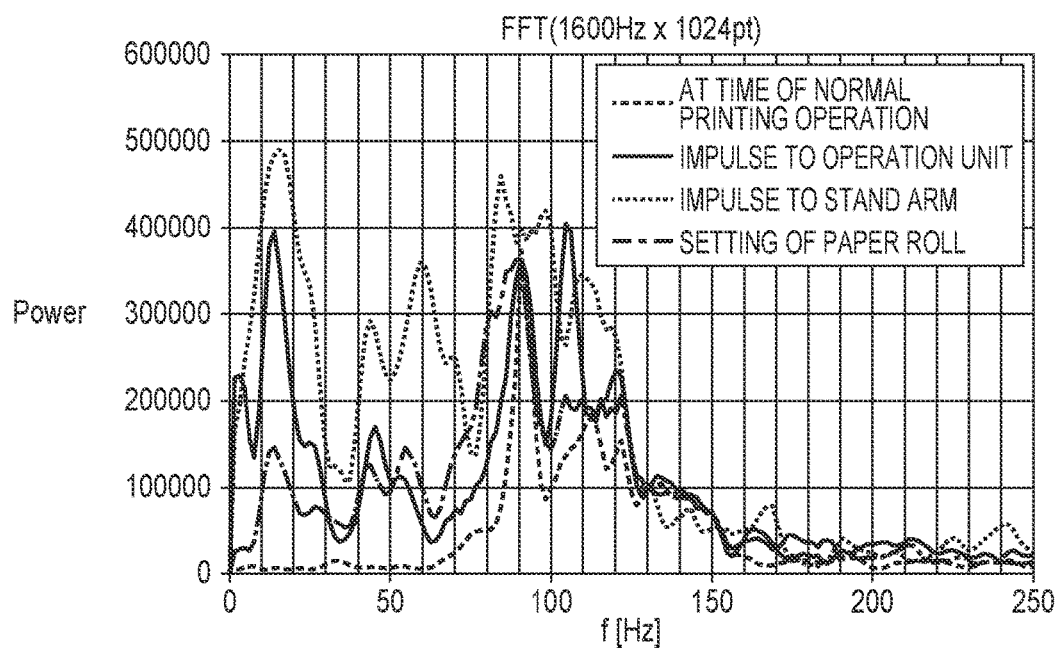

FIGS. 5A and 5B are views showing the power spectra of carriage acceleration obtained by FFT.

In FIG. 5A, the broken line indicates a power spectrum waveform obtained when the acceleration change from the start of acceleration of the carriage to constant speed at 17 inches per second during which it has traveled approximately 276 mm is transformed into the frequency domain by FFT. The vibration spectrum when the carriage moves with vibration is obtained when the acceleration value is transformed into the frequency domain, and peaks appear in several frequencies. In this example, 90 Hz is the frequency of interest. On the other hand, in FIG. 5A, the solid line indicates a power spectrum waveform obtained when a paper jam occurs in a constant speed region in the same operation and operation range as in the case of the broken line.

Comparing the solid line and the broken line, it is apparent that when a carriage operation abnormality such as a paper jam in which a paper is caught in a moving carriage occurs, its vibration is inhibited and changed. This also leads to changes in frequencies around the current frequency of interest of 90 Hz. In this manner, the change in the acceleration of the carriage, that is, the vibration spectrum during a carriage movement can be monitored in the frequency domain to determine a carriage operation abnormality, mainly, the occurrence of a paper jam due to a collision of the carriage and the paper sheet.

On the other hand, even when a carriage operation abnormality has not occurred, the vibration can be transferred to the carriage due to a user operation or when the user collides with the printing apparatus.

In FIG. 5B, the broken line indicates the same power spectrum as the broken line in FIG. 5A. The solid line indicates a power spectrum obtained when the operation panel 100 is forcefully operated during a carriage movement, and the dotted line indicates a power spectrum obtained when a person stumbles over the stand 101 during a carriage movement. Furthermore, the alternate long and short dashed line indicates a power spectrum obtained when the rolled sheet R is set to the lower paper roll attachment portion 4b during a carriage movement.

As it is apparent from comparing the solid line with each of these dotted, alternate long and short, and broken lines, a vibration which is different from that of a normal carriage operation has been measured in each of all the three cases. In this manner, an external impulse exerted on the main body of the printing apparatus is transferred to the carriage and may be detected by the acceleration sensor 52 in the carriage 5.

In a signal detected from such an external impulse, the impulse itself is transferred as a vibration to the carriage via the members forming the printing apparatus main body. As a result, the frequency characteristic differs from that of a carriage abnormality such as a jam. In the case of an external vibration, since the impulse is transferred via the carriage, the rolled sheet, a member holding the main body of the sheet, that is, via members which are larger than the carriage, its vibration frequency becomes lower than the frequency that occurs during carriage movement. In the example shown in FIG. 5B, vibrations caused by external impulses also have peaks in a frequency band of 60 Hz or less.

Hence, if these frequency characteristics are taken into consideration, an external impulse (in other words, an external impact or an external disturbance) given to the printing apparatus and a carriage operation abnormality can be separately detected by monitoring the changes in the acceleration of the carriage during a printing operation.

Note that each spectrum shown in FIGS. 5A and 5B plots the acceleration in a direction perpendicular to the traveling direction of the carriage. Although a similar kind of change can be monitored from the acceleration information obtained in the traveling direction of the carriage, it is superimposed with vibrations from a driving source such as a motor. Hence, it is preferable to perform spectral analysis in a direction perpendicular to the traveling direction of the carriage.

In addition, concerning the frequency of interest, its frequency and reference power spectrum can be determined upon shipping of the printing apparatus, upon powering on of the apparatus, or by operating the carriage before printing. Alternatively, its frequency and reference power spectrum may be determined by monitoring the carriage scan during printing. If the frequency of interest and the reference power spectrum are to be predetermined, the power spectrum in the frequency domain that accompanies the carriage movement changes in accordance with the speed of carriage movement during printing. Hence, it is preferable to set a threshold for each speed of carriage movement.

Next, several embodiments using the printing apparatus as described above to detect a carriage operation abnormality and to determine its cause will be described with reference to respective flowcharts.

First Embodiment

Figure 6:
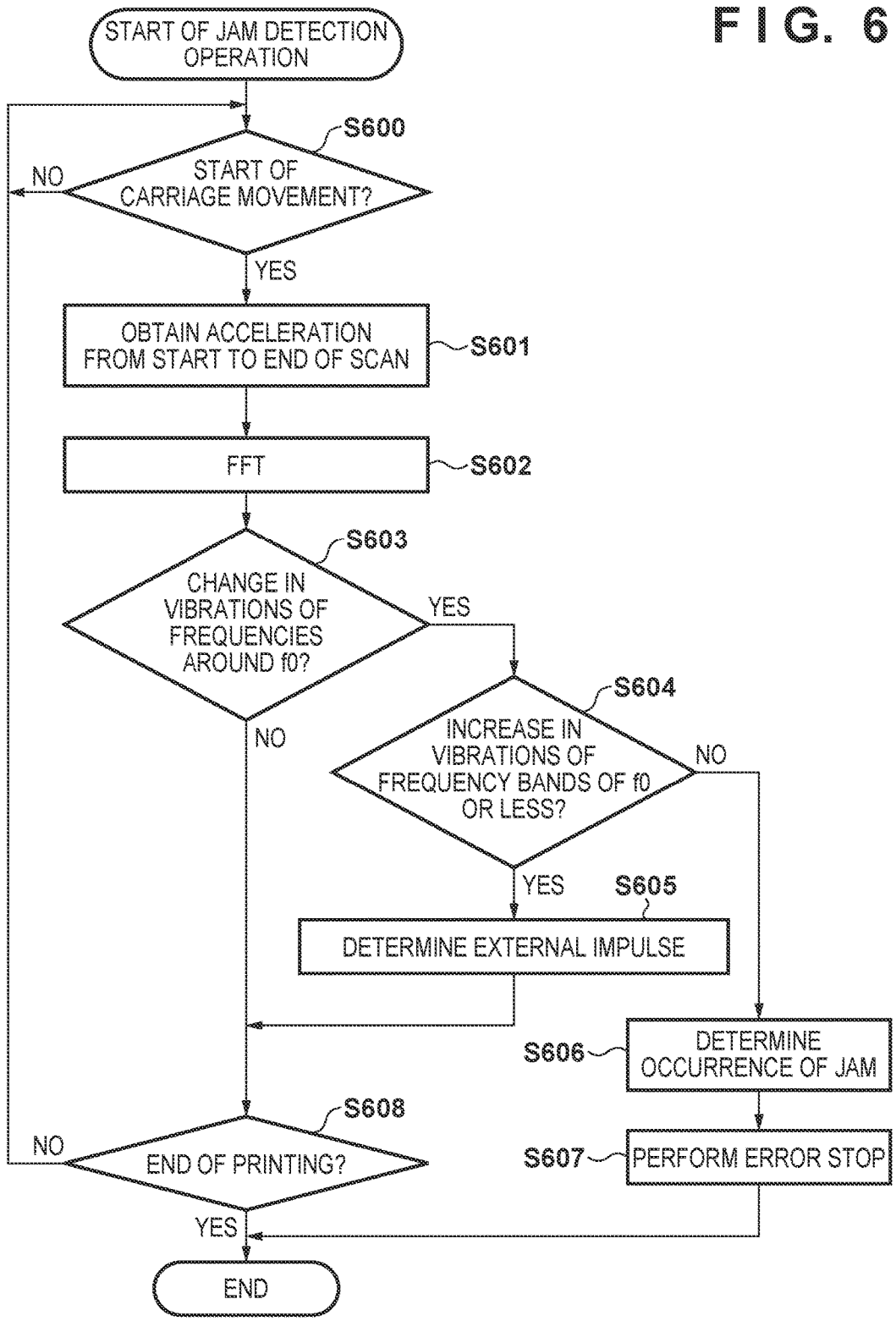
FIG. 6 is a flowchart showing processing of detecting a cause of a carriage operation abnormality during printing and notifying a user of the cause according to the first embodiment.

FIG. 6 is a flowchart showing processing of detecting the cause of a carriage operation abnormality during printing and notifying a user of the cause according to the first embodiment.

Upon start of the printing operation, if the start of carriage movement is confirmed in step S600, the process advances to step S601. In step S601, output values (acceleration information) from the acceleration sensor 52 are constantly obtained from the start of scanning till its end. The obtained values are buffered in the memory 46.

Next, in step S602, the buffered values (acceleration information) undergo FFT processing in the frequency transformation unit 45 and are transformed into acceleration information spectra of the frequency domain. Furthermore, in step S603, it is checked whether a power spectrum (PWf0) of the frequency of interest f0 (in this example, f0=90 Hz) has exceeded a predetermined threshold (TH) and has changed.

Here, if it is determined that the threshold has been exceeded ($\Delta$PWf0>TH), the process advances to step S604.

In step S604, it is determined whether a power spectrum of a frequency band (f=70 Hz) lower than f0 has changed. More specifically, it is checked whether a spectrum exceeding the predetermined threshold is present in a frequency equal to or less than 70 Hz.

Here, if it is determined that there is a spectrum which exceeds the threshold, the process advances to step S605, and it is determined to be a vibration change due to measuring a vibration caused by an external impulse (external disturbance) as described above. That is, the vibration detected in step S603 is determined to be an external impulse caused from a user operation or a sudden collision. In contrast, if it is determined that there is no spectrum which exceeds the threshold in a frequency equal to or less than 70 Hz, the process advances to step S606, and it is determined that a carriage operation abnormality, that is, a paper jam has occurred. Next, in step S607, the user is notified of the error due to the occurrence of a jam via the operation panel 100 by displaying a message, ringing a buzzer, or turning on a specific lamp, and the printing operation (carriage movement) is stopped. Subsequently, the processing ends. Note that in step S605, even in a case in which an external impulse is determined as the cause of the carriage operation abnormality, it can be set so that the user is notified of the occurrence of an external impulse to the apparatus via the operation panel 100. This warning notification can raise the awareness of the user so that he/she can be careful not to apply an external impulse to the apparatus.

Also, in step S603, if it is determined that the power spectrum is equal to or less than the threshold (PWf0$\leq$TH), that is, if there is no change in the power spectrum, the process advances to step S608. In the same manner, in step S605, if the vibration detected in step S603 is determined to be an external impulse, the process advances to step S608. Subsequently, in step S608, it is checked whether printing is to be continued. Here, if it is determined that the printing has not ended, the process returns to step S600 to perform measurements for the next carriage scan. The above processes are repeated until the printing ends. On the other hand, if the end of printing is determined, the processing ends.

Therefore, according to the above-described embodiment, the apparatus can accurately discriminate between a carriage abnormality and an external impulse by analyzing the spectra obtained from transforming output values (acceleration information) of the acceleration sensor into pieces of frequency domain information. As a result, it reduces situations in which the printing operation is inadvertently stopped due to the printing apparatus erroneously determining an external impulse, which has been applied to the apparatus by the user during printing, to be a paper jam. In addition, since the user is notified of the occurrence of the paper jam or the application of an external impulse, the user can accurately grasp the circumstance of the apparatus.

Second Embodiment

<Overview of Real Time Jam Determination (FIG. 7)>

Figure 7:
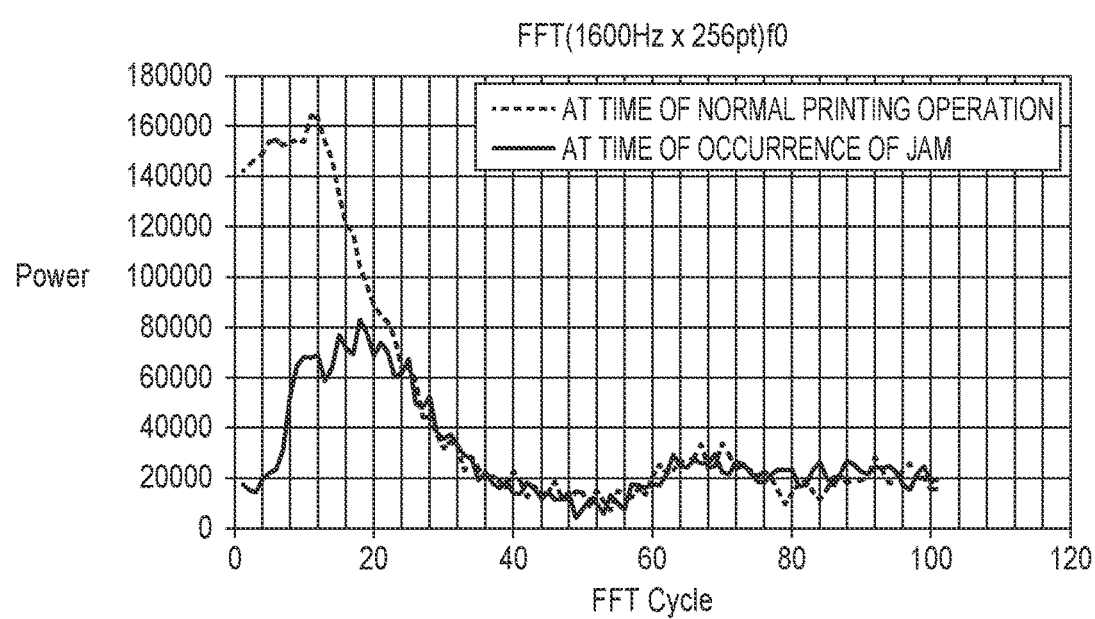
FIG. 7 is a line graph showing the change in a single frequency spectrum of acceleration during a carriage operation.

FIG. 7 is a line graph showing the change in a single frequency spectrum obtained from acceleration during a carriage movement. FIG. 7 is a line graph in which acceleration values obtained from the start of carriage movement until a constant speed state are transformed into a power spectrum in the frequency domain for every 256 points by FTT processing and the power spectrum of a frequency of interest is plotted by being shifted by one point.

In FIG. 7, a frequency of interest f0 is 87.5 Hz, the broken line indicates a transition of the power spectrum in a normal state, and the solid line indicates a transition of the power spectrum when a jam has occurred at the end of a printing sheet. When a jam occurs, since the vibration that accompanies a carriage movement is inhibited by the jam as described above, the transition of the power spectrum during an occurrence of a jam becomes lower than that in a normal state.

In the first embodiment, whether or not a jam has occurred is determined by executing spectral analysis at the point when one scan operation of the carriage had ended. However, the occurrence of a jam can be determined by executing frequency transformation sequentially during a carriage movement and monitoring the transition of the power spectrum in this manner. In this method, jam detection is possible at an earlier stage since the occurrence of a jam can be determined during the carriage movement.

In this embodiment, an example of real time detection of jam occurrence will be described.

Figure 8:
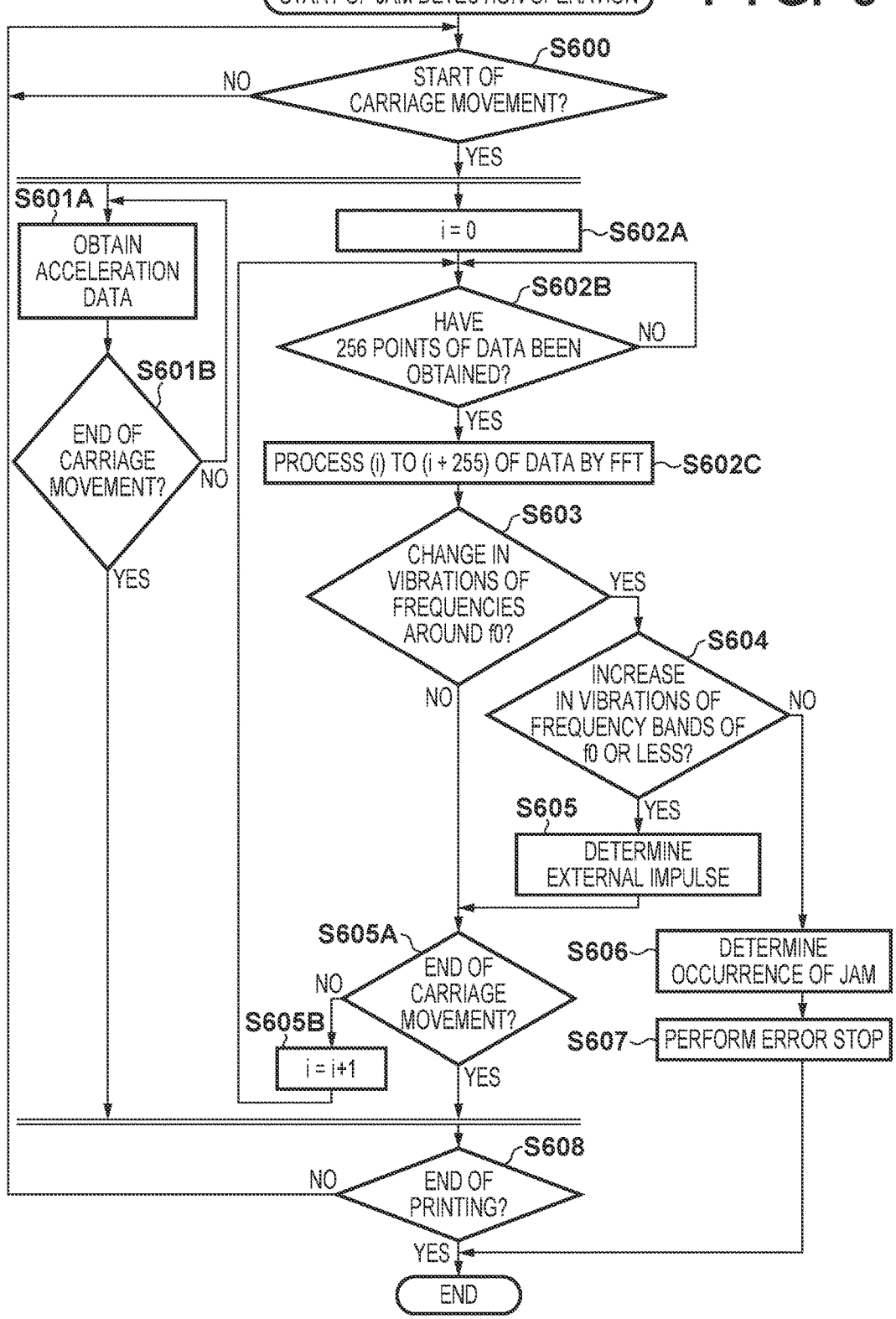
FIG. 8 is a flowchart showing processing of detecting a cause of a carriage operation abnormality during printing and notifying a user of the cause according to the second embodiment.

FIG. 8 is a flowchart showing processing of detecting the cause of a carriage operation abnormality during printing and notifying a user of the cause according to second embodiment. Note that in FIG. 8, the same step reference numbers as those already described with reference to FIG. 6 denote the same processing steps, and a description thereof will be omitted.

Upon start of the printing operation, if the start of carriage movement is confirmed in step S600, the process advances to steps S601A and S602A. Note that the processes of steps S601A and S601B and the processes of steps S602A to S607 are executed in parallel.

In step S601A, output values (acceleration data) from the acceleration sensor 52 are constantly obtained. The obtained values are buffered in the memory 46. Next, in step S601B, it is checked whether the carriage movement has ended. Here, if the carriage movement is to be continued, the process returns to step S601A. If the carriage movement has ended, the process advances to step S608. In this manner, the acceleration information of the carriage is obtained from the start till the end of the carriage movement.

On the other hand, in step S602A, a starting pointer (i) of the obtained data is cleared to zero, and the process advances to step S602B. In step S602B, it is checked whether 256 points of output values (acceleration data) have been accumulated. If it is determined that 256 points of acceleration data have been obtained, the process advances to step S602C. In step S602C, 256 points of acceleration data from the starting pointer (i) to (i+255) of the buffered values are input to the frequency transformation unit 45 and processed by FFT.

The processes described in the first embodiment are executed in steps S603 to S607 hereinafter.

In step S603, if PWf0≤TH and it is determined that there is no change in the power spectrum, the process advances to step S605A. In the same manner, in step S605, if the vibration detected in step S603 is determined to be an external impulse, the process advances to step S605A.

Then, in step S605A, it is checked whether the carriage movement has ended. Here, if it is determined that the carriage movement has not ended, the process advances to step S605B, and the starting pointer (i) to be used in the data sample for FFT processing is moved forward by 1 point. Subsequently, the process returns to step S602B. On the other hand, if it is determined that the carriage movement has ended, the process advances to step S608. In this manner, unless the occurrence of a jam is determined, the above-described processes are repeated until the carriage movement ends.

Note that as the threshold set in steps S603 and S604, the same predetermined value as that in the first embodiment may be set or a difference obtained from a comparison with the previous carriage scan operation or from the result of FFT of a previous point may be used.

Therefore, according to the above described embodiment, in addition to being able to accurately discriminate between a carriage abnormality and an external impulse by analyzing the spectra in the frequency domain as in the first embodiment, it is possible to perform real time determination of an abnormality during a carriage movement. Therefore, when a carriage abnormality is determined, the carriage movement can be stopped without waiting for the scan to end. In the case of an occurrence of a jam, the printing operation can be stopped before the error becomes serious, and the user can deal with the jam more easily.

Third Embodiment

<Jam Level Determination (FIG. 9)>

Figure 9:
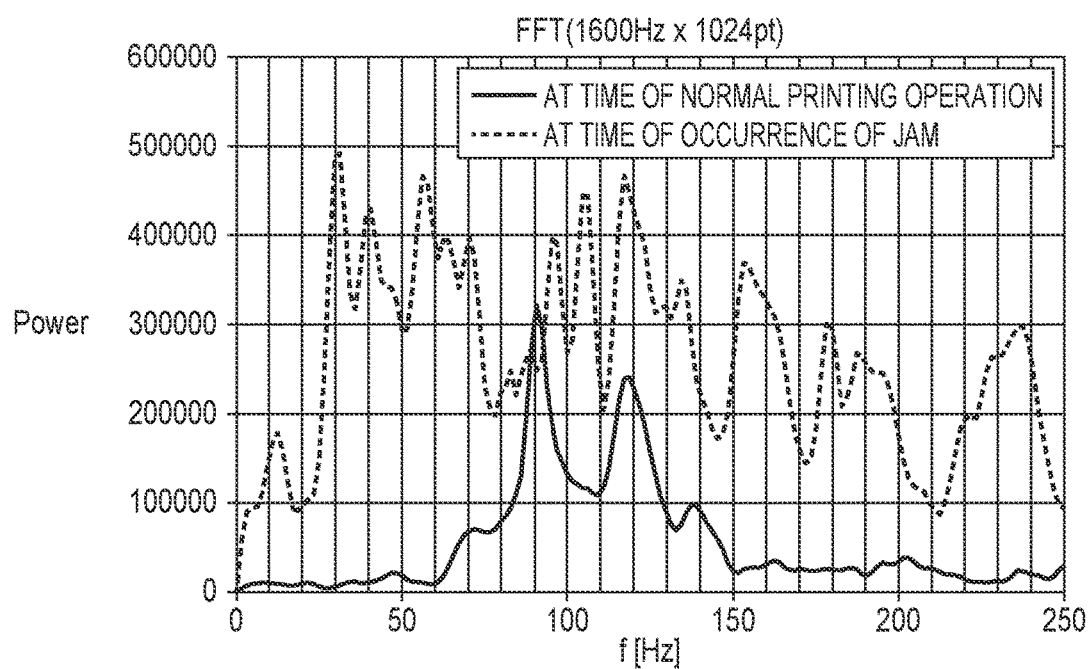
FIG. 9 is a line graph showing the change in the acceleration frequency spectra when a severe jam occurs during a carriage operation.

FIG. 9 is a line graph plotting power spectra transformed into the frequency domain by FFT processing of the acceleration values obtained from the start of carriage movement until the constant speed state.

In FIG. 9, the solid line indicates the transition of the power spectrum in a normal state and the broken line indicates the power spectrum when a severe jam has occurred. Here, a severe jam is "a jam in which a sheet has become folded and wrinkled after coming into contact with the carriage and the sheet is subsequently torn along with the operation of the carriage".

When such a severe jam occurs, the sheet which is deformed and wrinkled by the jam directly collides with the carriage, and a vibration due to the tear of the sheet is directly propagated to the carriage. In this case, as shown in FIG. 9, the vibration that occurs along with the carriage movement is detected mixed with low and high frequencies. When attention is paid to this feature, jam level determination is possible whereas only the occurrence of an external impulse or a jam was determined in the methods according to the first and second embodiments.

Hence, for example, at the point of jam occurrence detection, in the case of a severe jam in which a further operation of the carriage will create difficulties for a user to deal with the jam, it is possible to perform control to stop the carriage. In contrast, in the case of comparatively low (minor) level jam, the carriage can be temporarily moved to a capping position of the printhead before notifying the user of the occurrence of the jam so that the user can deal with the jam without touching the carriage. Additionally, since the printhead will be in a capped state even in a case in which the apparatus is left remaining in a jam state, troubles such as evaporation of the volatile component of the ink or increase in ink viscosity that may retrogressively occur due to the occurrence of the jam can be prevented. In this manner, the usability of the printing apparatus can be improved by changing the carriage operation after the occurrence of a jam.

In this embodiment, an example in which the degree (level) of the jam that has occurred is checked to perform operation control according to that level will be described.

Figure 10A:
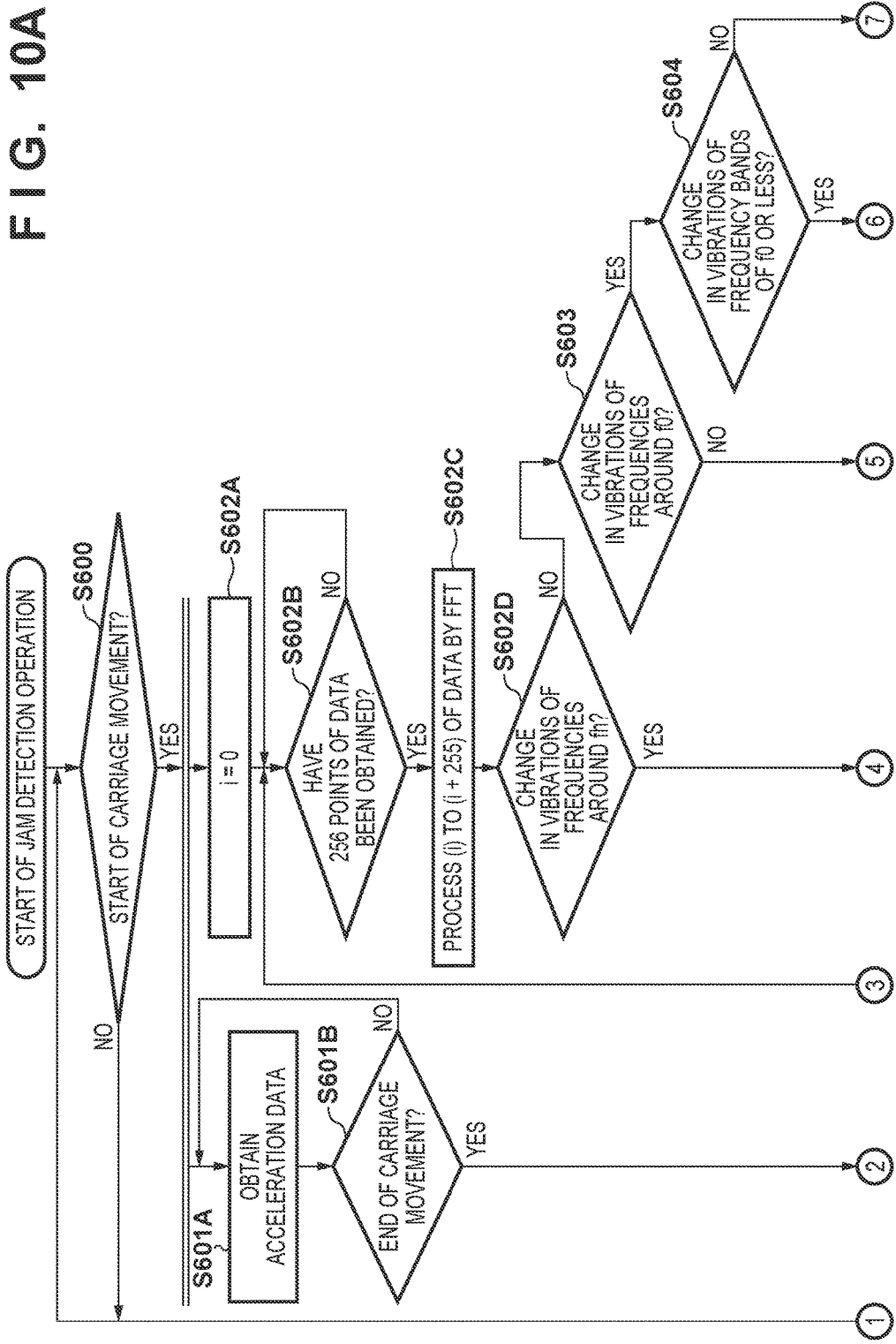
FIGS. 10A and 10B are flowcharts showing processing of detecting a cause of a carriage operation abnormality during printing and notifying a user of the cause according to the third embodiment.
Figure 10B:
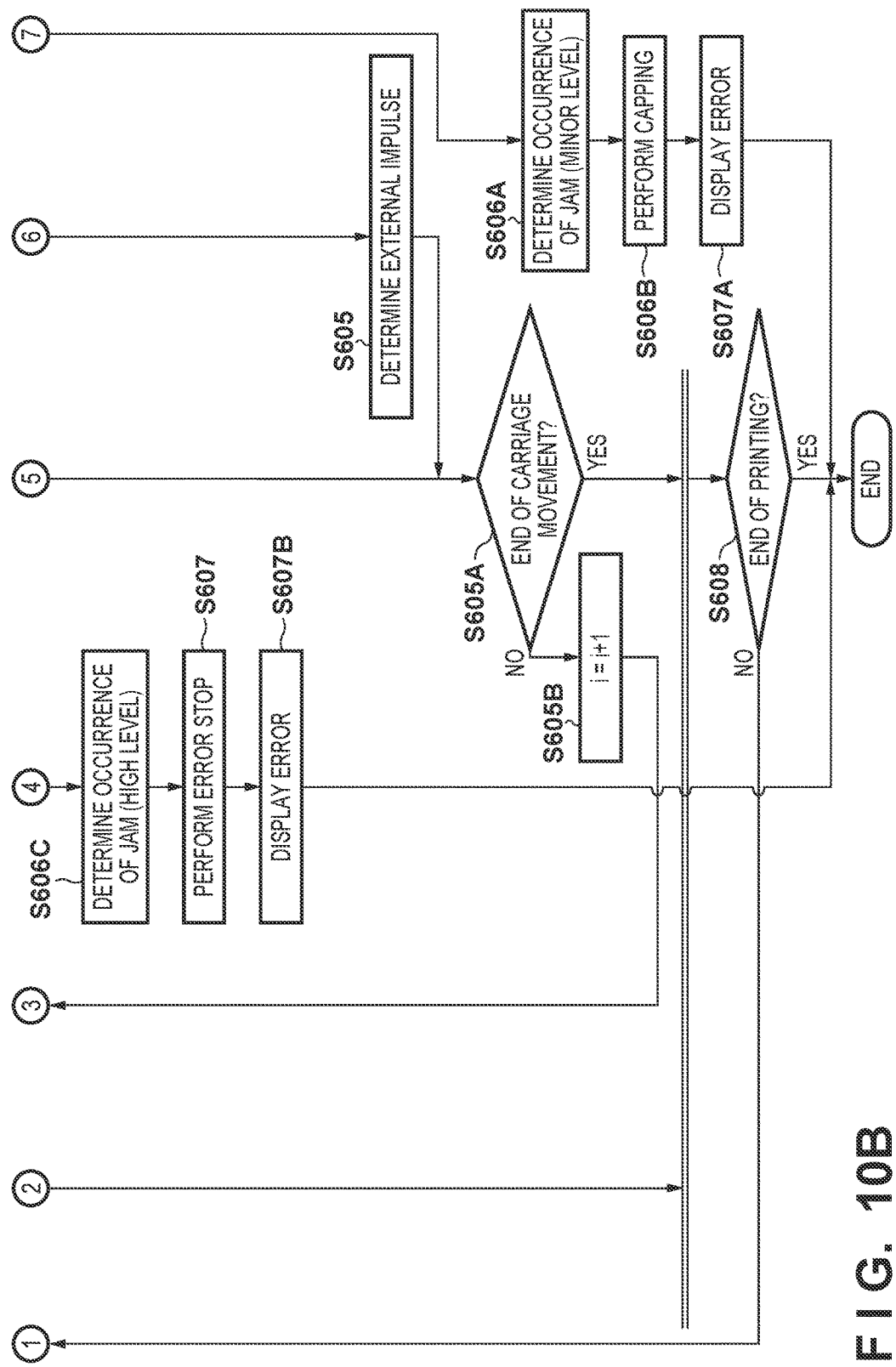

FIGS. 10A and 10B are flowcharts showing processing of detecting the cause of a carriage operation abnormality during printing and notifying a user of the cause according to third embodiment. Note that in FIGS. 10A and 10B, the same step reference numbers as those already described with reference to FIGS. 6 and 8 denote the same processing steps, and a description thereof will be omitted.

After steps S600 to S602C, in step S602D, it is checked whether a power spectrum (PWfh) of a frequency fh (for example, equal to or more than 200 Hz) higher than a frequency of interest f0 (for example, f0=90 Hz) has exceeded a predetermined threshold (THh) and has changed. As in the aforementioned embodiments, this threshold can be set at the shipping time of the printing apparatus main body, be determined by a carriage scan operation (for example, the average value of a previous plurality of scans) during printing, or be determined by executing the same scan before printing. In addition, since the carriage detects sheet deformation or a tear as described above, this determination may change the threshold in accordance with the characteristics (mainly the rigidity and thickness) of the sheet used for printing.

Here, if is determined that the power spectrum of the high frequency fh has exceeded the threshold (ΔPWfh>THh), the process advances to step S606C, and it is determined that a high level jam has occurred. Next, the process advances to step S607, and the carriage is immediately stopped. Then, in step S607B, the user is notified of the occurrence of the jam. Subsequently, the processing ends.

On the other hand, if it is determined that the power spectrum of the high frequency is equal to or less than the threshold (ΔPWfh≤THh), the process advances to step S603, and the aforementioned process is executed. Next, in step S604, it is checked whether the value of the power spectrum of the frequency of interest f0 or less than f0 of the carriage has changed. If the value has exceeded the threshold and changed (PWf0>TH), the process advances to step S605, and the same processes as those in the first and second embodiments are executed.

On the other hand, if the change is equal to or less than the threshold (PWf0≤TH), that is, if there is no change in the power spectrum, the process advances to step S606A. In step S606A, it is determined that a low level jam has occurred. Next, in step S606B, the printing is stopped and the carriage is moved to a predetermined position (for example, a home position), and the printhead is capped. Subsequently, in step S607A, the user is notified of the occurrence of the jam.

If there is no detection of an occurrence of a jam, the same processes as those in the first and second embodiments are performed.

Therefore, according to the above-described embodiment, the degree (level) of the jam that has occurred can be determined by monitoring a plurality of frequency domains with respect to the power spectrum of the acceleration in the frequency domain. Hence, it is possible to change the operation preceding the notification to the user in accordance with the level of the jam, and thus protect the printhead and improve the usability.

According to the above-described first to third embodiments, it is possible to determine whether the vibration that occurred in the carriages is due to an external impulse or a jam by transforming acceleration information obtained from an acceleration sensor mounted in the carriage into frequency domain information and monitoring its power spectrum. Furthermore, it is possible to determine the level of a jam by monitoring a plurality of frequency domains.

The printing apparatus shown in FIG. 1 has an arrangement in which the acceleration sensor is provided only in the carriage. However, the present invention is not limited to this. For example, the present invention is also applicable to a printing apparatus having an arrangement in which, in addition to the carriage, another acceleration sensor is provided somewhere on the printing apparatus main body other than the carriage.

Figure 11:
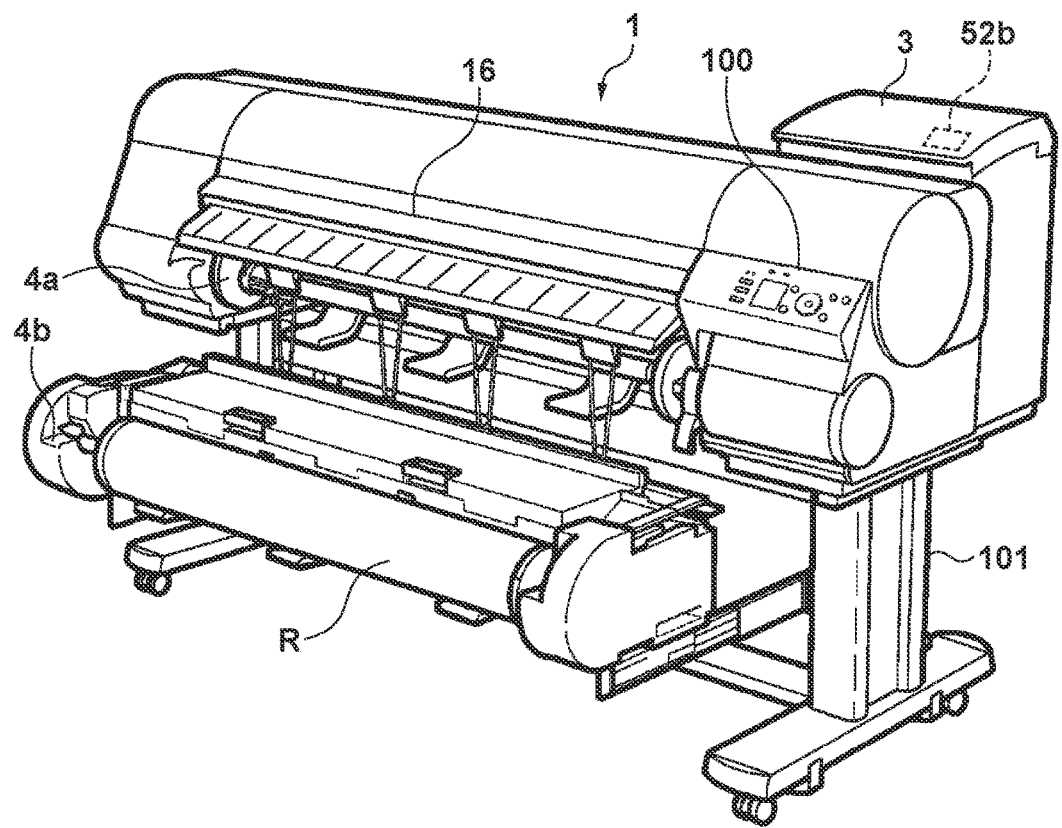
FIG. 11 is a perspective view showing the schematic arrangement of an inkjet printing apparatus of another embodiment.

FIG. 11 is a perspective view showing the schematic arrangement of an inkjet printing apparatus of another embodiment. Note that in FIG. 11, the same reference numbers as those already described with reference to FIG. 1 denote the same components, and a description thereof will be omitted. In the arrangement shown in FIG. 11, an acceleration sensor 52b (a second acceleration sensor) is provided on an ink tank cover 3 that is provided outside of the carriage in a printing apparatus 1. With this arrangement, the vibration (acceleration) given to the printing apparatus main body as well as that applied to a carriage 5 is detected.

Figure 12:
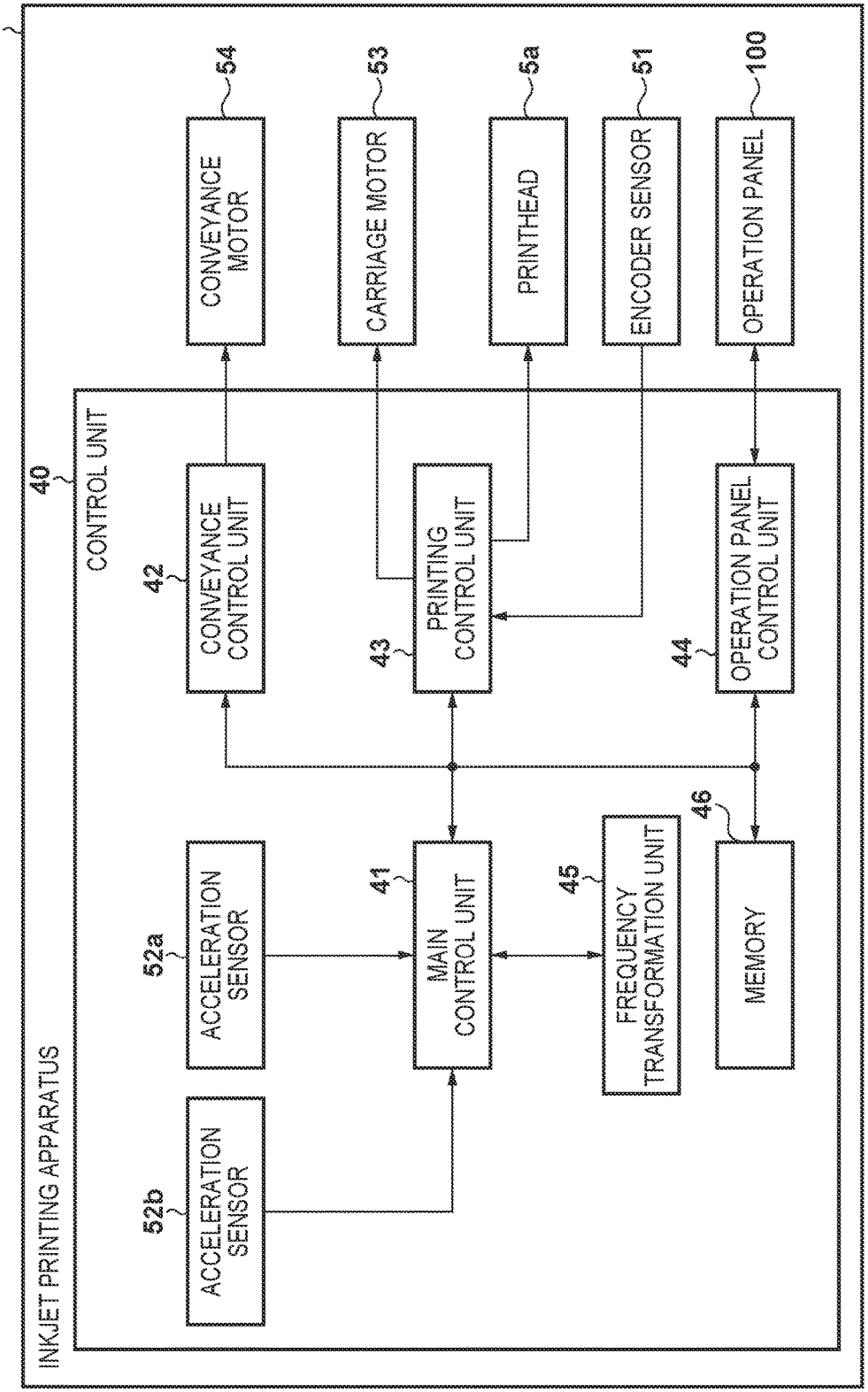
FIG. 12 is a block diagram showing the control arrangement of the printing apparatus shown in FIG. 11.

FIG. 12 is a block diagram showing the control arrangement of the printing apparatus shown in FIG. 11. Note that in FIG. 12, the same reference numbers as those already described with reference to FIG. 4 denote the same components, and a description thereof will be omitted. In addition, in FIG. 12, the acceleration sensor included in the carriage 5 is illustrated as an acceleration sensor 52a for the sake of descriptive convenience. As described above, the acceleration sensor 52a detects acceleration in the carriage movement direction (main scanning direction). Hence, in this arrangement, since the vibration also propagates to the printing apparatus upon movement of the carriage 5, the acceleration due to this vibration is detected by the acceleration sensor 52b.

As is obvious from comparing FIGS. 12 and 4, in the arrangement shown in FIG. 12, pieces of acceleration information from the two acceleration sensors 52a and 52b are input to a main control unit 41, and the pieces of acceleration information are held in a memory 46. Additionally, the main control unit 41 transfers an operation command to each of a conveyance control unit 42, a printing control unit 43, and an operation panel control unit 44 based on input values from the two acceleration sensors and an encoder sensor 51.

<Overview of Acceleration Change (FIG. 13)>

Figure 13:
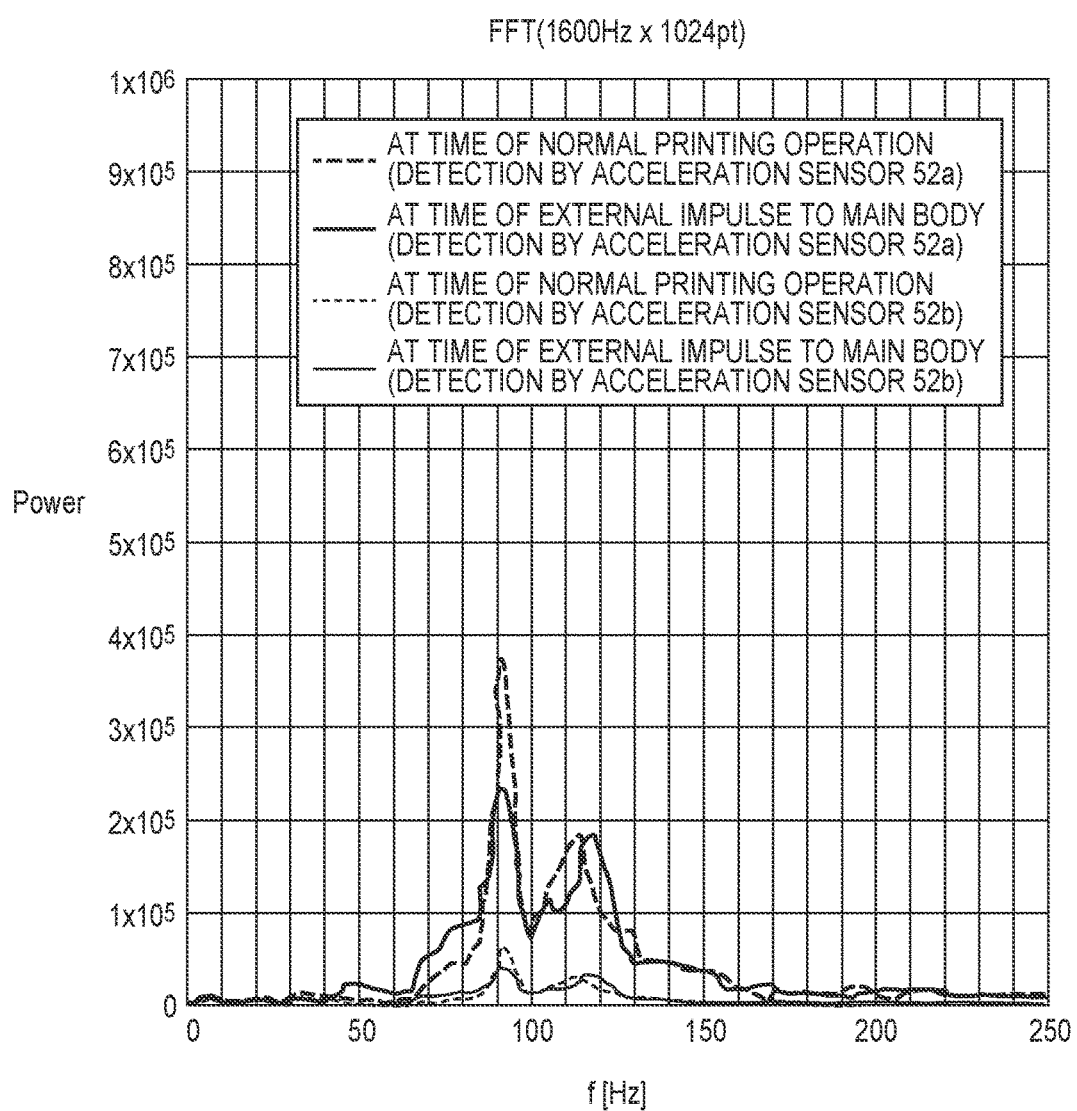
FIG. 13 is a line graph showing acceleration frequency spectra obtained from two acceleration sensors in the printing apparatus shown in FIG. 11.

FIG. 13 is a line graph showing the power spectra of carriage acceleration obtained by FFT. The power spectra in this graph have been obtained by two acceleration sensors under the same measurement conditions as those described with reference to FIGS. 5A and 5B. Hence, a description of measurement conditions will be omitted.

In FIG. 13, the thick solid line and the thick broken line are power spectra detected by the acceleration sensor 52a included in the carriage 5, and the thin solid line and the thin broken line are power spectra detected by the acceleration sensor 52b. Each broken line is a detection result obtained at the time of a normal printing operation, and each solid line is a detection result obtained when an external impulse has been applied to the printing apparatus main body. As is apparent from FIG. 13, different power spectrum waveforms are obtained from different acceleration sensors even when they are under the same conditions.

Few embodiments that detect a carriage operation abnormality and determine its cause will be described using the printing apparatus having an arrangement in which a separate acceleration sensor is provided in the printing apparatus main body as described with reference to FIGS. 11 to 13 will be described hereinafter.

Fourth Embodiment

Figure 14:
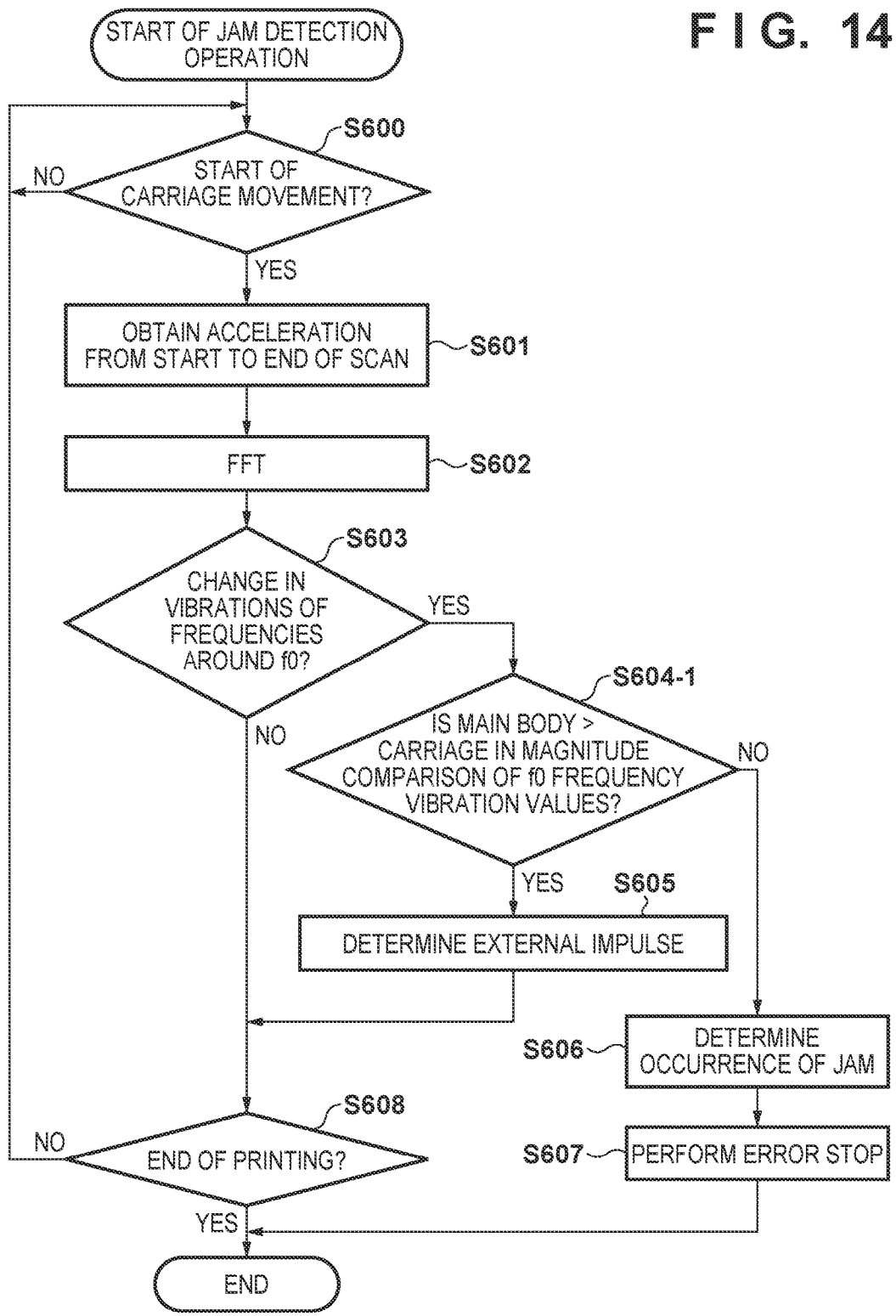
FIG. 14 is a flowchart showing processing of detecting a cause of a carriage operation abnormality during printing and notifying a user of the cause according to the fourth embodiment.

FIG. 14 is a flowchart showing processing of detecting the cause of a carriage operation abnormality during printing and notifying a user of the cause according to the fourth embodiment. Note that in FIG. 14, the same step reference numbers as those already described with reference to FIG. 6 denote the same processing steps, and a description thereof will be omitted.

According to FIG. 14, after steps S600 to S602, in step S603, if it is determined that a power spectrum (PWf0) of a frequency of interest f0 (in this example, f0=90 Hz) has exceeded a predetermined threshold (TH) and changed (ΔPWf0>TH), the process advances to step S604-1.

In step S604-1, a power spectrum obtained from an acceleration sensor 52a and a power spectrum obtained from an acceleration sensor 52b are used to compare the magnitudes of the power spectra in the frequency of interest f0 (in this example, f0=70 Hz). More specifically, with respect to the frequency of interest f0, if the power spectrum obtained from the acceleration sensor 52b is larger than the power spectrum obtained from the acceleration sensor 52a, a vibration change arising from the printing apparatus main body is determined, and the process advances to step S605. On the other hand, with respect to the frequency of interest f0, if the power spectrum obtained from the acceleration sensor 52b is equal to or less than the power spectrum obtained from the acceleration sensor 52a, a vibration change arising from the carriage is determined, and the process advances to step S606.

Therefore, according to the above-described embodiment, the apparatus can accurately discriminate between a carriage abnormality and an external impulse by analyzing the spectra obtained from transforming output values (acceleration information) of a plurality of (two) acceleration sensors into pieces of frequency domain information.

Fifth Embodiment

<Jam Level Determination (FIG. 15)>

FIG. 15 is a line graph plotting power spectra obtained by transforming the acceleration values from the start of carriage movement until the constant speed state into the frequency domain by FFT processing.

As is apparent from comparing FIG. 15 and FIG. 9, the thick solid line in FIG. 15 is the same as that in FIG. 9 and indicates the transition of a normal state power spectrum detected by an acceleration sensor 52a. Additionally, the broken line in FIG. 15 and FIG. 9 indicates a power spectrum of a case in which an occurrence of a severe jam is detected by the acceleration sensor 52a. Furthermore, the thin solid line in FIG. 15 indicates the transition of a power spectrum detected by an acceleration sensor 52b at the time of an occurrence of a jam.

Note that since the severe jam has been already described with reference to FIG. 9, a description thereof will be omitted.

In this embodiment, an example in which the degree (level) of the jam that has occurred is checked based on the detection results of the two acceleration sensors to perform operation control according to that level will be described.

Figure 16A:
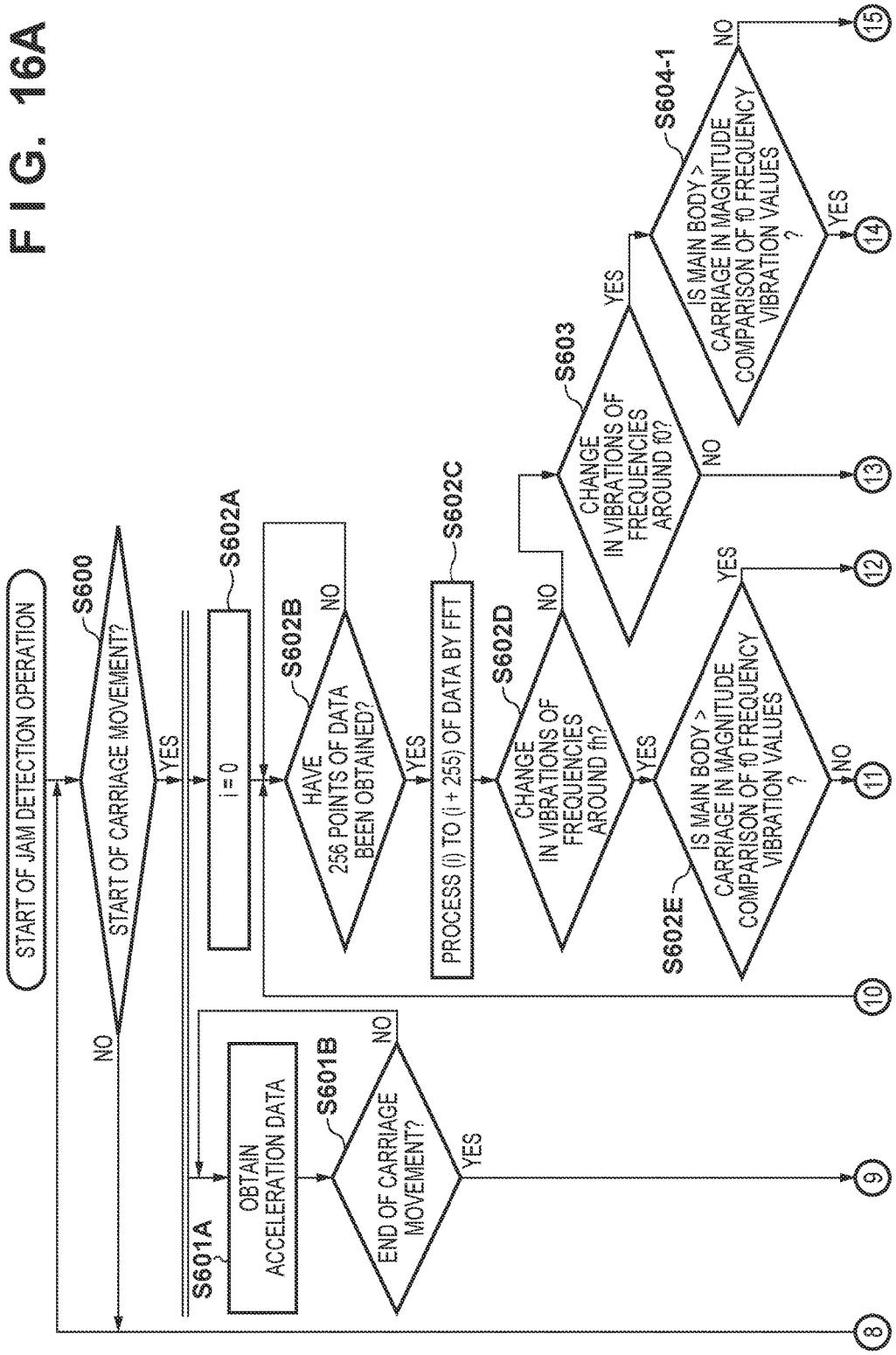
FIGS. 16A and 16B are flowcharts showing processing of detecting a cause of a carriage operation abnormality during printing and notifying a user of the cause according to the fifth embodiment.
Figure 16B:
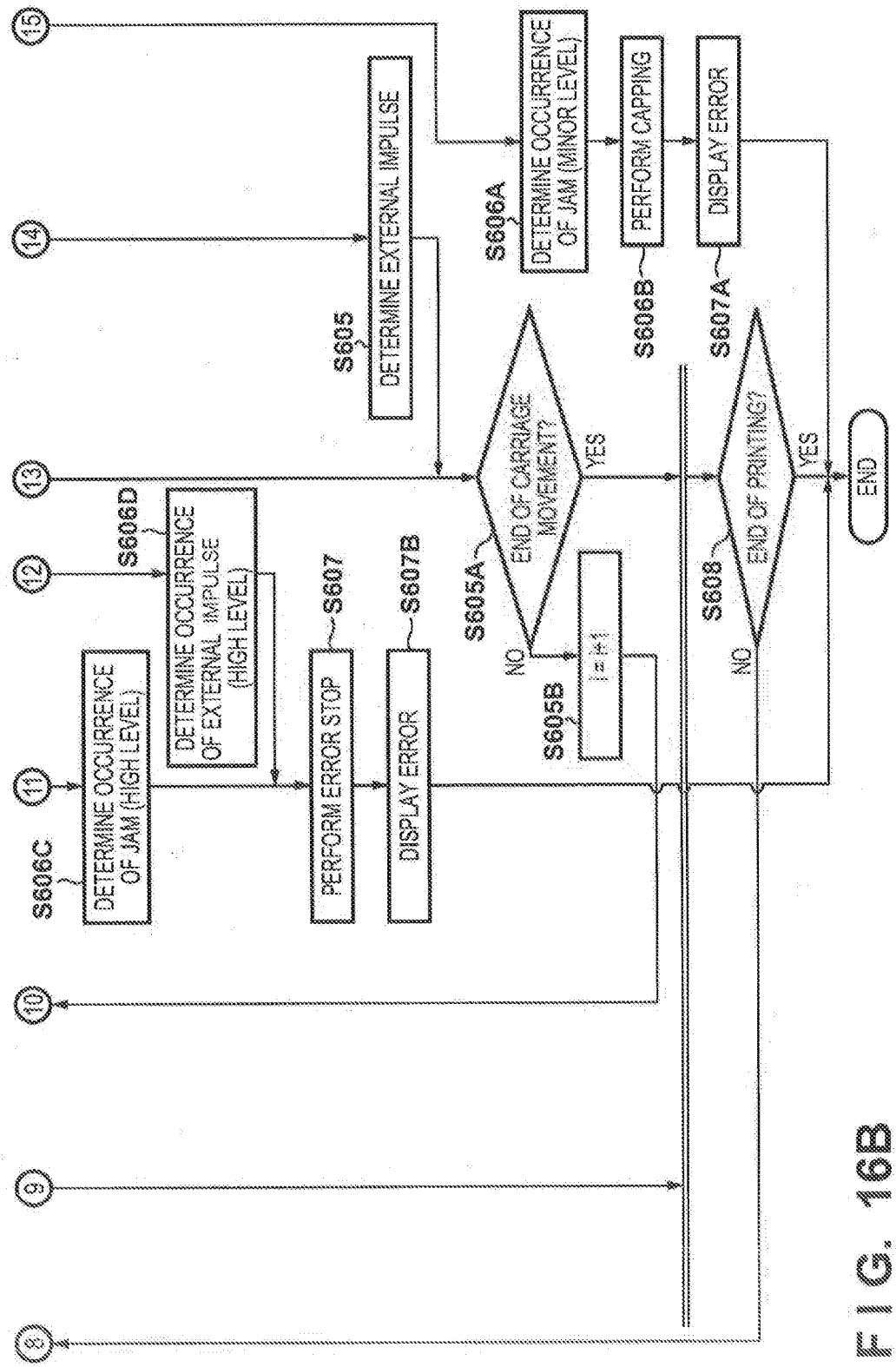

FIGS. 16A and 16B are flowcharts showing processing of detecting the cause of a carriage operation abnormality during printing and notifying a user of the cause according to fifth embodiment. Note that in FIGS. 16A and 16B, the same step reference numbers as those already described with reference to FIGS. 6, 8, 10A, 10B, and 14 denote the same processing steps, and a description thereof will be omitted.

According to FIGS. 16A and 16B, after steps S600 to S602C, it is checked whether a power spectrum (PWfh) of a frequency fh (for example, fh≥200 Hz) higher than a frequency of interest f0 (for example, f0=90 Hz) has exceeded a predetermined threshold (THh) and has changed in step S602D.

Here, if is determined that the power spectrum of the high frequency fh has exceeded the threshold (ΔPWfh>THh), the process advances to step S602E. In step S602E, the magnitudes of the power spectrum obtained from the acceleration sensor 52a and the power spectrum obtained from the acceleration sensor 52b are compared with respect to the frequency of interest f0. Here, if the power spectrum obtained from the acceleration sensor 52b is larger than the power spectrum obtained from the acceleration sensor 52a, the process advances to step S606D, and it is determined that a high level external impulse has occurred in the printing apparatus main body. Subsequently, the process advances to step S607.

In contrast, if the power spectrum obtained from the acceleration sensor 52b is equal to or less than the power spectrum obtained from the acceleration sensor 52a, the process advances to step S606C, and it is determined that a high level jam has occurred.

On the other hand, if it is determined that the power spectrum of the high frequency fh is equal to or less than the threshold (ΔPWfh≤THh), the process advances to step S603, and the aforementioned processing is executed. In step S604-1, the power spectrum obtained from an acceleration sensor 52a and the power spectrum obtained from an acceleration sensor 52b are used to compare the magnitudes of the power spectra with respect to the frequency of interest f0 (in this example, f0=70 Hz). As a result, if a vibration change arising from the printing apparatus main body is determined as described above, the process advances to step S605. On the other hand, if a vibration change arising from the carriage is determined, the process advances to step S606A.

Therefore, according to the above-described embodiment, the degree (level) of the jam that has occurred can be determined by using the detection results of a plurality of acceleration sensors.

Sixth Embodiment

Here, an example of how the cause of a carriage operation abnormality can be detected without the use of frequency transformation in an arrangement using two acceleration sensors as that described with reference to FIGS. 11 to 13 will be described.

<Jam Level Determination without Use of Frequency Transformation (FIGS. 17A to 17C)>

Figure 17A:
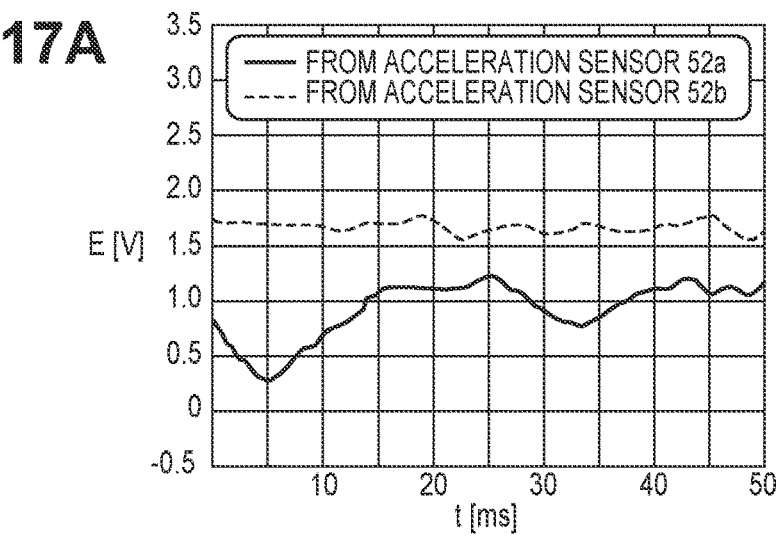
FIGS. 17A, 17B, and 17C are line graphs showing voltage output waveforms of an acceleration sensor on a carriage and an acceleration sensor on a printing apparatus under different circumstances.
Figure 17B:
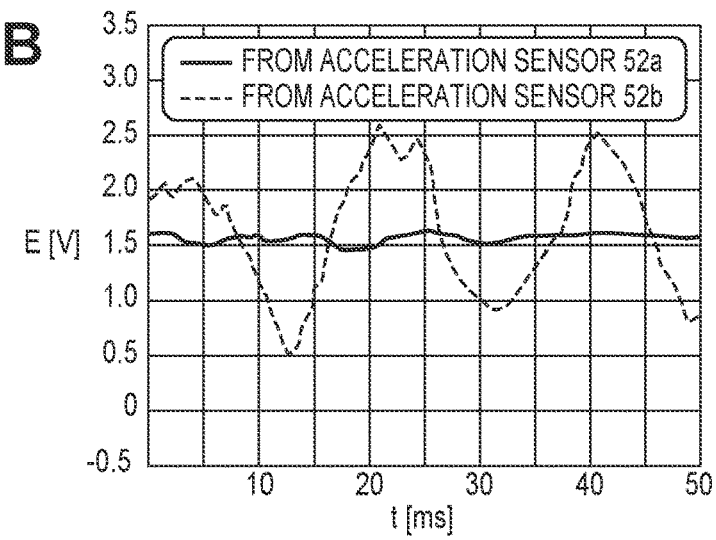
Figure 17C:
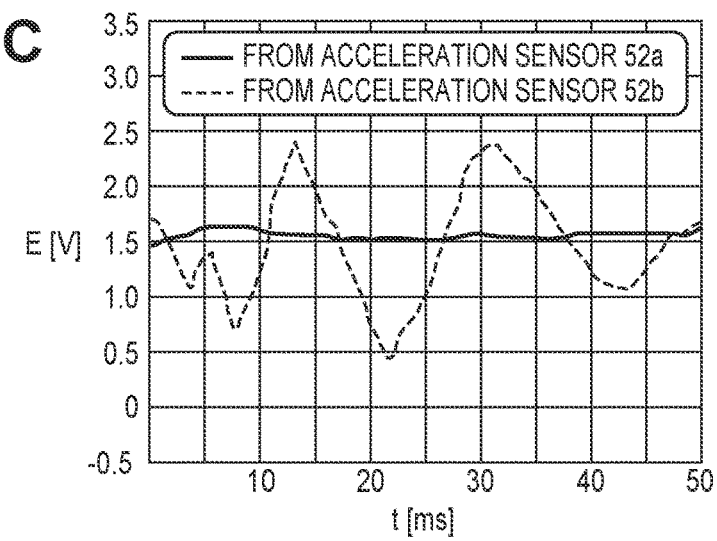

FIGS. 17A to 17C are line graphs each showing temporal changes of the outputs of two acceleration sensors 52a and 52b due to an occurrence of a jam or an external impulse during printing with respect to a carriage movement direction. Note that the waveforms shown in these graphs are those before transformation by FFT and show the temporal changes of output voltages from the acceleration sensors. In each of FIGS. 17A to 17C, the solid line indicates an output waveform of the acceleration sensor 52a provided in a carriage 5 and the broken line indicates an output waveform of the acceleration sensor 52b provided in a printing apparatus main body.

FIG. 17A shows output waveforms detected at the time of an occurrence of a paper jam during printing. Since a paper jam is an impulse which occurs from direct physical contact between the carriage 5 and a paper (sheet), the output waveform of the acceleration sensor 52a largely changes. However, the output waveform of the acceleration sensor 52b converges on a certain value with little change in the amplitude. This is because the acceleration sensor 52b of the printing apparatus main body has low degree of mechanical/physical coupling with the carriage and is uninfluenced by the vibration of the paper jam.

In the same manner as FIG. 17A, FIG. 17B shows the transition of the output waveforms of the two acceleration sensors due to an impulse (vibration) arising from the opening and closing of a cover 16 of the main body during printing. The results shown in FIG. 17B indicate that, in contrast to those shown in FIG. 17A, the impulse has little influence on the carriage 5 since the occurrence source of the impulse is on the side of the printing apparatus main body which has a low degree of mechanical/physical coupling with the carriage 5.

FIG. 17C shows output waveforms of the two acceleration sensors arising from an external impulse that occurs when a person or a thing collides with the printing apparatus main body. In FIG. 17C, in the same manner as FIG. 17B, the output waveform of the acceleration sensor 52b largely changes while there is little influence on the output waveform of the acceleration sensor 52a.

Figure 18:
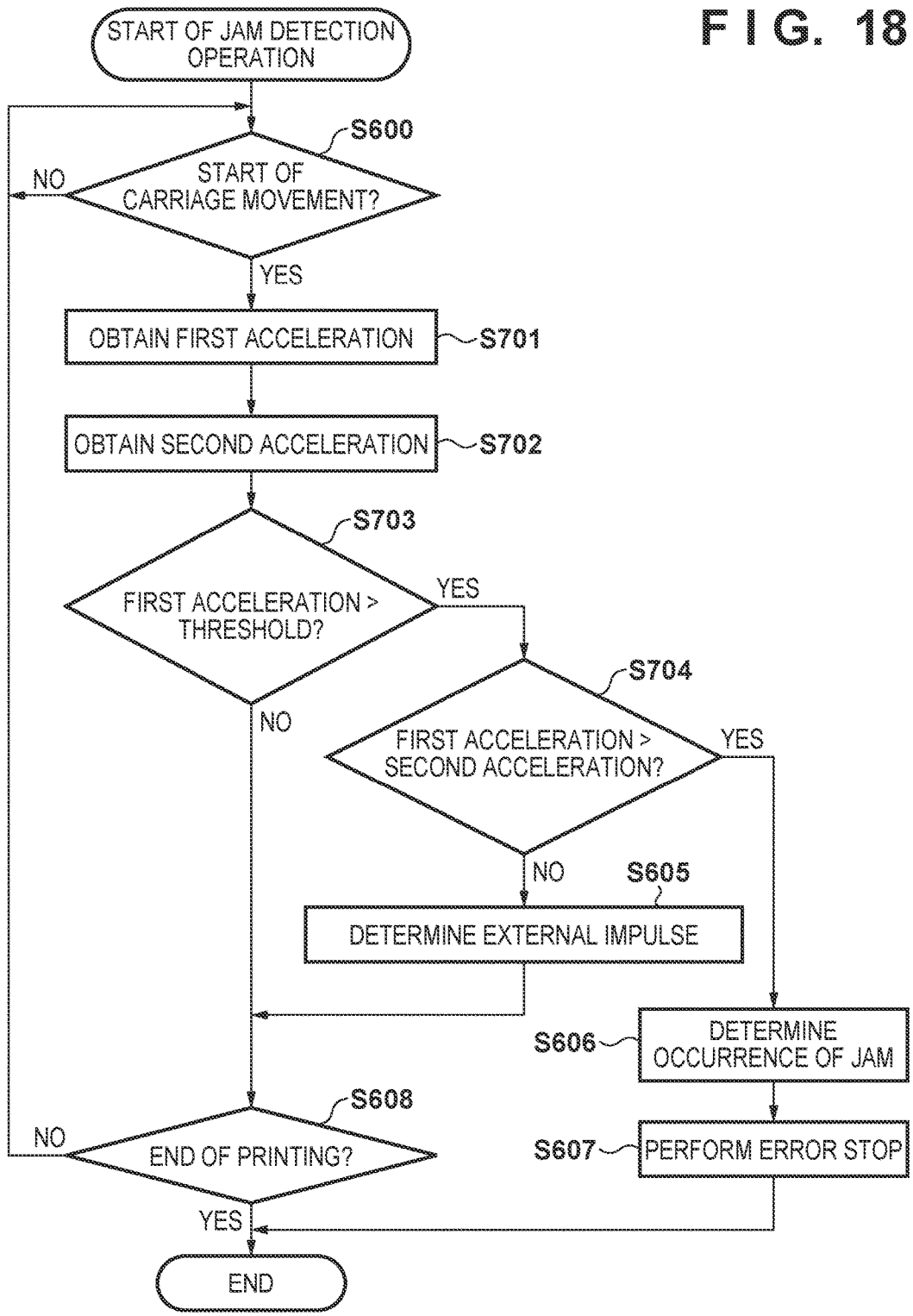
FIG. 18 is a flowchart showing processing of detecting a cause of a carriage operation abnormality during printing and notifying a user of the cause according to the sixth embodiment.

FIG. 18 is a flowchart showing processing of detecting the cause of a carriage operation abnormality during printing and notifying a user of the cause according to the sixth embodiment. Note that in FIG. 18, the same step reference numbers as those already described with reference to FIG. 6 denote the same processing steps, and a description thereof will be omitted.

Upon start of the printing operation, if the start of carriage movement is confirmed in step S600, the process advances to step S701. In step S701, an acceleration (first acceleration: $\alpha 1$) in the carriage movement direction is obtained from the acceleration sensor 52a included in the carriage 5. Additionally, in step S702, an acceleration (second acceleration: $\alpha 2$) in the carriage movement direction is obtained from the acceleration sensor 52b included in the printing apparatus main body.

In the subsequent process in step S703, it is checked whether the acceleration (first acceleration: $\alpha 1$) obtained in step S701 has exceeded a threshold (TH) set as an unreachable acceleration during normal printing. Here, if $\alpha 1 \leq TH$, it is determined that there is no abnormal vibration in the carriage 5, and the process advances to step S608. If $\alpha 1 > TH$, it is determined that an acceleration change corresponding to a carriage operation abnormality has been detected, and the process advances to step S704.

In step S704, it is determined whether the cause of the acceleration of the carriage is the carriage itself or an external impulse on the side of the main body. Hence, the magnitude of the first acceleration ($\alpha 1$) obtained in step S701 and that of the second acceleration ($\alpha 2$) obtained in step S702 are compared. Here if $\alpha 1 \leq \alpha 2$ (if the acceleration of the printing apparatus main body is equal to or larger), it is determined that the cause of the acceleration of the carriage is an external impulse, and the process advances to step S605. On the other hand if $\alpha 1 > \alpha 2$ (if the acceleration of the carriage is large), it is determined that the cause of the acceleration of the carriage is on the side of the carriage, that is, that the cause is a paper jam, and the process advances to step S606.

Therefore, according to the above described embodiment, the cause of a carriage operation abnormality can be detected without frequency transformation of the outputs of the two acceleration sensors. In addition, in this embodiment, there is no need to hold the output data from the acceleration sensors and execute FFT using the held data.

Hence, it is advantageous in that a more real time detection of the cause of a carriage operation abnormality can be performed.

In the above-described first to fifth embodiments, it is possible to discriminate the specific nature of subtle vibration patterns arising from the carriage as the paper jam occurrence source and of those arising from an external impulse to the printing apparatus main body having a low degree of mechanical/physical coupling with the carriage. In addition, in the sixth embodiment, acceleration sensors are provided in the carriage which is the jam occurrence source and in the printing apparatus main body which is influenced the most by an external impulse, and the outputs from a plurality of acceleration sensors can be used to determine, almost in real time, an occurrence of a paper jam and the occurrence of an external impulse. In this manner, it is possible to prevent beforehand as well as quickly deal with unexpected trouble, and mechanical damage to the printing apparatus due to a carriage operation abnormality can be reduced.

Furthermore, it is possible to compare the magnitudes of the outputs from the acceleration sensors by arranging, in a dispersed manner, a plurality of acceleration sensors in locations that have weak degree of mechanical/physical coupling in the printing apparatus main body in order to discriminate not only a paper jam but also other abnormal vibrations that have influence on the printing apparatus main body such as an abnormal vibration in the installation location (building) arising from an earthquake or the like.

Note that although the above-described embodiments exemplified a single function printing apparatus, the present invention is not limited to this. For example, it may be a multifunction printer (copying machine) that includes an image reading apparatus (scanner apparatus) in the above-described printing apparatus. Furthermore, it may be a copying machine added with a facsimile function.

Note that the above-described embodiments described an example of a printing apparatus that performs printing by using a rolled sheet, for example, a large sheet of a size B0 or A0. However, the present invention is not limited to this. For example, the present invention is also applicable to a printer that performs printing on a small sheet of a size B4 or A4.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-027247, filed Feb. 16, 2016, and 2016-237092, filed Dec. 6, 2016, which are hereby incorporated by reference herein in their entirety.

What is claimed is:

1. A printing apparatus comprising:
a carriage configured to mount a printhead and move;
an acceleration sensor provided in the carriage; and
at least one processor and at least one memory coupled to the at least one processor, the at least one processor serving as units comprising:
a transformation unit configured to obtain an obtained spectrum by frequency-transforming an output of the acceleration sensor; and
a determination unit configured to determine, based on the obtained spectrum, at least one of an operation abnormality of the carriage and an external impulse given to the printing apparatus, wherein the determination unit includes:
- a first determination unit configured to determine, in a predetermined frequency of interest, whether the obtained spectrum exceeds a first threshold; and
- a second determination unit configured to determine, in a frequency band lower than the frequency of interest, whether the obtained spectrum exceeds a second threshold, and the determination unit
(1) determines that the carriage operates normally if the first determination unit determines that the obtained spectrum is not more than the first threshold with respect to the frequency of interest,
(2) determines that the external impulse has occurred if the first determination unit determines that the obtained spectrum exceeds the first threshold with respect to the frequency of interest and the second determination unit determines that the obtained spectrum exceeds the second threshold with respect to the frequency band lower than the frequency of interest, and
(3) determines that a jam of a printing sheet caused by the carriage has occurred if the first determination unit determines that the obtained spectrum exceeds the first threshold with respect to the frequency of interest and the second determination unit determines that the obtained spectrum does not exceed the second threshold with respect to the frequency band lower than the frequency of interest.

2. The apparatus according to claim 1, further comprising a notification unit configured to notify a user of a determination result of the determination unit.

3. The apparatus according to claim 1, further comprising a stopping unit configured to stop a carriage movement if the occurrence of the operation abnormality of the carriage is determined by the determination unit.

4. The apparatus according to claim 1, wherein a determination by the determination unit is performed for each scan of the carriage.

5. The apparatus according to claim 1, wherein the transformation unit executes, for each time a predetermined number of data are obtained by the transformation unit during a carriage movement, frequency-transformation using the obtained data, and the determination unit performs the determination during the carriage movement.

6. The apparatus according to claim 1, wherein the determination unit further comprises a third determination unit configured to determine whether the obtained spectrum exceeds a third threshold with respect to a frequency band higher than the frequency of interest, wherein the determination unit
(4) determines that a severe jam of the sheet caused by the carriage has occurred if the third determination unit determines that the obtained spectrum exceeds the third threshold with respect to the frequency band higher than the frequency of interest, and
(5) determines that a minor jam of the sheet caused by the carriage has occurred if the third determination unit determines that the obtained spectrum is not more than the third threshold with respect to the frequency band higher than the frequency of interest, the first determination unit determines that the obtained spectrum exceeds the first threshold with respect to the frequency of interest, and the second determination unit determines that the obtained spectrum does not exceed the second threshold with respect to the frequency band lower than the frequency of interest.

7. The apparatus according to claim 6, further comprising a capping unit configured to move the carriage to a predetermined position and cap the printhead if the determination unit determines that the minor jam has occurred.

8. The apparatus according to claim 1, wherein the frequency of interest is a frequency in which a peak appears in the obtained spectrum if the jam of the sheet has occurred, and
a peak appears in the obtained spectrum in the frequency band lower than the frequency of interest if the external impulse has occurred.

9. The apparatus according to claim 1, wherein the transformation unit transforms an acceleration of the carriage measured by the acceleration sensor into a spectrum of a frequency domain by FFT processing.

* * * * *